(12) United States Patent
Hanuni et al.

(10) Patent No.: US 8,422,481 B2
(45) Date of Patent: Apr. 16, 2013

(54) REAL TIME PEER TO PEER NETWORK

(75) Inventors: Uzi Hanuni, Emek Haela (IL); Michael Rothschild, Ramot Hashavim (IL); Yakir Matusovsky, Holon (IL); Georgy Rosenberg, Bat Yam (IL)

(73) Assignee: Maxtech Communication Networks Ltd., Yavne, IL (US)

( * ) Notice: Subject to any disclaimer, the term of this patent is extended or adjusted under 35 U.S.C. 154(b) by 1193 days.

(21) Appl. No.: 12/066,680

(22) PCT Filed: Sep. 20, 2006

(86) PCT No.: PCT/IB2006/053408
§ 371 (c)(1),
(2), (4) Date: Mar. 13, 2008

(87) PCT Pub. No.: WO2007/034428
PCT Pub. Date: Mar. 29, 2007

(65) Prior Publication Data
US 2008/0268855 A1    Oct. 30, 2008

Related U.S. Application Data

(60) Provisional application No. 60/718,681, filed on Sep. 20, 2005.

(51) Int. Cl.
*H04B 7/212* (2006.01)
(52) U.S. Cl.
USPC ........... 370/348; 455/445; 455/11.1; 455/500
(58) Field of Classification Search .................. 370/254, 370/255, 395.2, 395.21, 348.431, 395.41, 370/432, 443, 468, 477; 709/227, 228, 229; 455/445, 11.1, 500
See application file for complete search history.

(56) References Cited

U.S. PATENT DOCUMENTS

| | | | |
|---|---|---|---|
| 5,719,868 A | 2/1998 | Young | |
| 5,887,022 A | 3/1999 | Lee et al. | |
| 5,943,322 A | 8/1999 | Mayor et al. | |
| 6,304,556 B1 | 10/2001 | Haas | |
| 6,580,909 B1 | 6/2003 | Carro | |
| 6,628,636 B1 | 9/2003 | Young | |
| 6,744,740 B2 | 6/2004 | Chen | |
| 6,751,196 B1 | 6/2004 | Hulyalkar et al. | |
| 6,791,949 B1 | 9/2004 | Ryu et al. | |
| 7,181,547 B1* | 2/2007 | Millet | 709/251 |
| 2002/0143855 A1* | 10/2002 | Traversat et al. | 709/202 |
| 2003/0078062 A1 | 4/2003 | Burr | |
| 2004/0125776 A1 | 7/2004 | Haugli et al. | |
| 2004/0172474 A1* | 9/2004 | Markaryan et al. | 709/228 |
| 2005/0247775 A1* | 11/2005 | Gloekler et al. | 235/375 |

* cited by examiner

*Primary Examiner* — Chi Pham
*Assistant Examiner* — Alexander O Boakye
(74) *Attorney, Agent, or Firm* — Marty Fleit; Paul D. Bianco; Fleit Gibbons Gutman Bongini Bianco PL

(57) ABSTRACT

A method of managing data transmission in a mesh-topology ad-hoc network. The method includes transmitting management information by a plurality of mobile stations of the network, selecting a mobile station to serve as a master, responsive to the transmitted management information, transmitting to the master requests for bandwidth, allocating bandwidth by the master, responsive to the requests and forwarding the bandwidth allocation to the mobile stations of the network.

17 Claims, 6 Drawing Sheets

REAL TIME PEER TO PEER NETWORK

RELATED APPLICATIONS

This application claims the benefit under 119(e) of 60/718,681 filed on Sep. 20, 2005, the disclosure of which is incorporated herein by reference.

FIELD OF THE INVENTION

The present invention relates to communications and particularly to peer to peer communication networks between moving units.

BACKGROUND OF THE INVENTION

In many areas of the world, mobile stations communicate through a cellular network, which comprises fixed base stations and infrastructure links that connect the base stations.

The dependence on base stations and infrastructure communication links between the base stations is not generally desired in emergency cases, such as in areas of war and/or nature disasters, where the base stations may not be functioning or may be overloaded. In addition, some areas of the world are not covered by base stations. Therefore, it is desired to provide a peer to peer network in which communications are established directly between the mobile stations only, without the use of base stations. The peer to peer network is desired to be an adhoc network in which the topology of the network may change often, and therefore measures need to be taken to monitor the topology of the network. The mobile stations of a peer to peer network may be used, for example, by members of a rescue team going out on a mission in a disaster area.

Some peer to peer networks are configured for a star topology in which all or nearly all the mobile stations can communicate directly with each other, or via a single central mobile station, designated as a control station, which allocates bandwidth to the other mobile stations responsive to their requests for bandwidth.

U.S. Pat. No. 6,751,196 to Hulyalkar et al., the disclosure of which is incorporated herein by reference, describes a peer to peer communication network in which a mobile station that serves as a centralized control station is periodically selected responsive to the quality of communications between each pair of mobile stations in the network. Each mobile station monitors signals that it receives from other mobile stations and accordingly determines the quality of the connection with the other mobile stations. The '196 patent suggests using a single intermediate mobile station as a relay station for connections between two mobile stations having a low quality connection.

For situations in which the mobile stations are designed to be distributed over a relatively large geographical area, the use of a star topology requires that the mobile stations transmit at a relatively high power, which results in relatively rapid consumption of the battery power of the mobile stations. For such situations, some peer to peer networks use protocols designed for mesh topologies in which each mobile station communicates directly only with a relatively small percentage of the mobile stations in the network. In order to communicate with remote mobile stations, intermediate mobile stations serve as relay stations. Utilizing a mesh topology moderates power consumption and generally also allows better utilization of bandwidth, as a plurality of mobile stations remote from each other can transmit signals on the same channel concurrently.

In mesh topology networks, a method is required to route messages from a source mobile station to a destination mobile station. A simple method is based on each mobile station that receives a message re-broadcasting the message. This method, however, is very wasteful in bandwidth, as each message may be transmitted many more times than required in order for it to be received by the destination and may be received a plurality of times by many of the mobile stations of the network.

In other methods for transmission in a mesh topology network, each mobile station manages connectivity information on the entire network and thus can route messages to their destination without unnecessary repetitions.

U.S. patent publication 2004/0125776 to Haugli et al., the disclosure of which is incorporated herein by reference, describes a peer to peer network in which each mobile station transmits periodic control messages that include information on how it can be reached, and each mobile station manages a routing table on how each of its neighbors can be reached.

U.S. Pat. No. 6,304,556 to Haas, the disclosure of which is incorporated herein by reference, describes use of a proactive-reactive hybrid protocol for routing within a peer to peer network.

In still other methods, a backbone of nodes is defined for the network. Packets are transmitted from their source to the destination, through the mobile stations belonging to the backbone.

U.S. Pat. No. 6,744,740 to Chen, the disclosure of which is incorporated herein by reference, describes a method for establishing a self-organizing network. Global positioning signals (GPS) are used to determine locations of nodes of the network and form a spanning tree of the network.

U.S. Pat. No. 6,791,949 to Ryu et al., the disclosure of which is incorporated herein by reference, describes a distributed protocol for managing a backbone of a network. Each of the nodes of the network periodically transmits a signaling packet with partial information on the topology of the network.

In some mesh topology peer to peer networks, a channel is available for transmission by all mobile stations, without allocation of the bandwidth of the channel. A mobile station desiring to transmit, checks the channel for an empty slot and transmits in the empty slot. If a plurality of neighboring mobile stations transmit in a same slot, the transmissions are all lost in what is referred to as a contention. Generally, when a contention occurs, the mobile stations identify the contention and organize retransmission of the lost data. The allowance of contentions may result in delayed delivery of data, which is problematic in real time applications. Various methods have been suggested to reduce the rate of occurrence of contentions.

U.S. patent publication 2003/0078062 to Burr, the disclosure of which is incorporated herein by reference, describes a peer to peer network in which a non-allocated synchronization channel is used by mobile stations to arbitrate and select a data channel for communicating.

U.S. Pat. No. 5,887,022 to Lee et al., the disclosure of which is incorporated herein by reference, describes a peer to peer frequency hopping network in which a synchronization channel is used by mobile stations to arbitrate and select a data channel for communicating from a plurality of available channels. The synchronization channel is divided into slots in a manner which reduces the occurrences of contentions.

These methods do not, however, eliminate contentions and therefore other transmission methods were suggested.

U.S. Pat. Nos. 5,719,868 and 6,628,636 to Young, the disclosures of which are incorporated herein by reference, describe a distributed method of assigning slots in a multi-hop network. Each node determines a local slot assignment based on information it receives from its neighbors.

U.S. Pat. No. 6,580,909 to Carro, the disclosure of which is incorporated herein by reference, describes a communication system in which the permission to transmit is passed between the stations of the network as a token in the form of an ordered list including all the stations registered to the network.

These methods are not suitable for real-time transmissions in large mesh networks, as the delay between consecutive transmission sessions of a single mobile station may be larger than acceptable for real time speech transmission.

U.S. Pat. No. 5,943,322 to Mayor et al., the disclosure of which is incorporated herein by reference, describes a peer to peer network which uses a code division multiple access (CDMA) system for transmissions. One of the mobile stations becomes a control station and controls the transmission power in the network.

SUMMARY OF THE INVENTION

An aspect of some embodiments of the present invention relates to an ad-hoc network of mobile stations in which provisions are made to allocate bandwidth for transmission of voice signals from one end of the network to the other end of the network within a predetermined time. Optionally, bandwidth is allocated so that voice signals traverse the network from end to end in less than 300 milliseconds or even in less than 250 milliseconds.

In some embodiments of the invention, the path from end to end of the network passes through at least 4, 6 or even 8 mobile stations.

An aspect of some embodiments of the present invention relates to an ad-hoc network of mobile stations adapted to broadcast voice data in real-time throughout the network, such that the broadcast voice data reaches all the mobile stations currently connected in the network. Optionally, a master centrally allocates bandwidth for data broadcast throughout the network. When data broadcast is required, the master optionally allocates time slots for broadcast transmission, to a broadcasting source and to a plurality of relay units that broadcast the data from the source throughout the network.

An aspect of some embodiments of the present invention relates to allocating bandwidth for data (e.g., voice) transmissions in a mesh topology ad-hoc network of mobile stations, by a dynamically selected mobile station referred to as a master. In some embodiments of the invention, the ad-hoc network is managed in a manner which supports a mesh topology network having a diameter of at least three, five or even seven mobile stations. The diameter of the network is defined as the minimal number of mobile stations that a packet needs to pass through between two mobile stations requiring a largest minimal number of relay mobile stations in order to communicate. Allocating the bandwidth by a dynamically selected mobile station allows the network to continue its operation even if one or more of the mobile stations which is assigned to perform the allocation breaks down or is out of reach.

In some embodiments of the invention, mobile stations forming a backbone tree of the network are selected periodically. Bandwidth requests from the mobile stations are forwarded to the master over the backbone tree. In addition, the bandwidth allocation from the master is optionally forwarded to the mobile stations through the backbone tree.

Determining the bandwidth allocation by a selected master enables limiting the transmission time of data from one end of the network to an opposite end, such that real time telephony signals can be transmitted over the network at relatively high quality. The achievement of real time transmission requires that the signals transmitted from a first user to a second user and a response from the second to the first are provided in a sufficiently short time such that the user feels it is real time transmission. For example, the transmission may require a round trip delay of less than 0.5 seconds to be considered real time.

In some embodiments of the invention, the master is selected based on connectivity information of the network. In an exemplary embodiment of the invention, the master is selected from the mobile stations belonging to the backbone tree. Selecting the master based on connectivity information of the network may result in appointing a new master even when the old master is still connected to the network and can serve as the master. Alternatively, the master is selected without relation to the connectivity information of the network, beyond the fact that the selected master is connected to the network.

Optionally, all mobile stations of the network are configured with hardware and/or software required to serve as the master. Alternatively, some mobile stations of the network are made simple and cannot serve as the master.

Decisions on bandwidth allocation are optionally performed repeatedly at a relatively high frequency, in order to minimize a delay between requesting and receiving bandwidth and to avoid situations in which bandwidth allocation is not used due to changes in the network topology. In some embodiments of the invention, decisions on bandwidth allocation are performed at least twice a minute, 10 times a minute or even 100 times a minute. In an exemplary embodiment of the invention, allocation is performed more than 240 times a minute, for example 273 times a minute. Optionally, allocation is performed at a frequency corresponding to a cycle time shorter than the maximal delay generally allowed for delivery of telephony signals, e.g., less than 250 ms.

In some embodiments of the invention, the master allocates bandwidth only for data (e.g., voice) transmission and not for management information. Optionally, all data transmissions in the network are on bandwidth allocated by the master. Alternatively, only some of the bandwidth for data is allocated by the master and other data bandwidth is predetermined, not-allocated or is allocated using other methods.

In some embodiments of the invention, bandwidth for network management and/or requesting data-bandwidth is not allocated (i.e., mobile stations transmit in free slots with the risk of contentions), is predetermined, or is allocated using a distributed method. Alternatively, management and request bandwidth is allocated by the master that allocates the data bandwidth or by a different dynamically selected mobile station. Further alternatively or additionally, bandwidth for management and/or requesting data-bandwidth is allocated using two or more different methods (e.g., both use of pre-allocated bandwidth and use of non-allocated contention based bandwidth). In an exemplary embodiment of the invention, bandwidth for management and/or requesting data-bandwidth is predetermined or is not allocated, but in addition the master may allocate bandwidth for management when necessary and/or when there is available bandwidth.

For any given period, the master optionally allocates bandwidth only to a single mobile station, throughout the entire network, not using geographical repetition. Alternatively, when the master determines that two or more mobile stations are sufficiently separated from each other, bandwidth may be allocated to both the mobile stations concurrently, if this is advantageous for enlarging the network capacity.

In some embodiments of the invention, a single channel is used for all the transmissions in the network. Alternatively, two or more channels may be used for the transmissions, for example one of the channels may be used for management and bandwidth allocation while one or more other channels may be used for data transmission. As used herein, a channel is defined by a given frequency and a given code. Signals transmitted concurrently by two different transmitters on a same channel would interfere with each other and in general not allow decoding of the signals if the transmitters are close to each other.

It is noted that some or all of the mobile stations may incorporate apparatus for transmission through other networks, such as cellular or satellite networks, which will use other channels different from the one or more channels used by the ad-hoc network.

An aspect of some embodiments of the present invention relates to a method of bandwidth allocation in an ad-hoc network of mobile stations, in which a master allocating slots does not indicate for at least some of the slots the identities of the mobile stations to receive the slots. Optionally, predetermined rules allow the mobile stations of the network to determine the allocations of all the slots based on the identities of the mobile stations explicitly stated as receiving slots.

In some embodiments of the invention, the master determines a bandwidth allocation for transmission of data from a source through a path including a plurality of mobile stations and notifies the bandwidth allocation to the mobile stations in an allocation packet. The allocation packet indicates fewer than all the mobile stations assigned bandwidth, and the mobile stations determine the entire allocation of bandwidth based on connectivity information of the network that they manage.

In some embodiments of the invention, the allocation packet indicates a source and a single next hop which are assigned bandwidth slots. The remaining mobile stations that are allocated bandwidth are determined responsive to the source and the single next hop and from connectivity information of the network, for example, a backbone of the network determined by each mobile station separately.

An aspect of some embodiments of the invention relates to an ad-hoc peer to peer network in which the bandwidth is divided into transmission cycles and each of the mobile stations of the network is assigned a predetermined slot in each cycle for transmitting network management information and/or bandwidth requests. Using predetermined slots for management and/or request packets makes the synchronization of the mobile stations simpler than if the synchronization of the network depends on continuous reception of synchronization signals. Thus, a mobile station disconnected from the network for a short period may return to transmit in the network in a next cycle, without a lengthy synchronization procedure.

It is noted that the pre-assignment of a slot to each mobile station is generally relatively wasteful in bandwidth, since bandwidth may be allocated also to mobile stations that are out of range, inoperable or do not require bandwidth. However, in some situations it can be advantageous to trade off bandwidth for convenience of synchronization.

In some embodiments of the invention, the transmission cycles are relatively frequent, for example occurring less than every 10 seconds, less than every 2 seconds or even less than every 300 milliseconds. Optionally, the pre-assigned bandwidth occupies more than 10%, 20% or possibly even more than 30% of the cycle. The remaining bandwidth of each cycle is optionally used for data transmission.

The pre-assigned slots are optionally used to transmit a packet, which includes both bandwidth requests and management information, such as information on the connectivity of the network.

An aspect of some embodiments of the invention relates to a peer to peer network in which substantially all regular transmissions (e.g., over 90%), including both management and data transmissions, are carried out in slots that are assigned to a single unit, such that there is no risk of a contention unless an error occurs. In some embodiments of the invention, at least some of the slots are pre-assigned.

In some embodiments of the invention, provisions are not made for retransmissions in a link layer of the mobile stations, even when a contention is identified due to an error. Optionally, a packet lost due to a contention is not retransmitted. Instead, the application layer generates a different packet with the same data or with more updated data and transmits that packet instead of the data lost in the contention. Not operating a retransmission mechanism of the link layer in cases of contentions allows better control on the timing of transmissions, so that real time audio transmission is achievable with relatively high quality.

In some embodiments of the invention, acknowledgment messages are not transmitted, in order to reduce transmission delay.

An aspect of some embodiments of the invention relates to a method of managing connectivity information in a peer to peer network, in which each mobile station manages connectivity information on the entire network and periodically transmits information with respect to the connectivity of a sub-group including at least one but less than all mobile stations of the network. Each time connectivity information is transmitted, the mobile station optionally transmits only information that was updated since it was last transmitted or information that was transmitted less than a predetermined number of times since it was last updated. Optionally, in at least some of the transmissions, only some of the information which was updated since its last transmission is transmitted. Optionally, the connectivity information is transmitted in a slot of a predetermined size and the amount of connectivity information depends on the capacity of the slot.

In some embodiments of the invention, the connectivity information is used in generating a backbone tree which determines how data is transmitted throughout the network.

In an exemplary embodiment of the invention, each mobile station manages two matrices of connectivity information which indicate a connectivity state between each two mobile stations in the network. One of the matrices includes the most up-to-date information available to the mobile station, while the second matrix includes the information transmitted by the mobile station. In transmitting connectivity information, the mobile station optionally determines the difference between the matrices and transmits only portions (e.g., rows) that are different.

An aspect of some embodiments of the invention relates to a method of managing connectivity information in a peer to peer network, in which mobile stations are periodically assigned a slot of a predetermined size for reporting connectivity information. The mobile stations select less than all the connectivity information for transmission in the slot, according to the size of the slot.

An aspect of some embodiments of the invention relates to a method for transmission of connectivity information in a peer to peer network. The method includes determining a size of a packet to be transmitted and then selecting connectivity information to be transmitted in the packet. At least in some occasions, the data transmitted is less than needs to be transmitted and the mobile station selects the connectivity information to be transmitted according to its importance. In some embodiments of the invention, the importance of the connectivity information is determined according to the extent of the difference between what was already transmitted and the current information and/or according to a time stamp of the information.

An aspect of some embodiments of the invention relates to a method of transmission in an ad-hoc network, in which requests for bandwidth are transmitted by at least some of the mobile stations before the identity of the master that is to perform the allocation is finalized. Transmission of the requests before the master is selected allows faster allocation of bandwidth, while allowing dynamic selection of the master, for best operation of the master.

In some embodiments of the invention, requests for bandwidth are transmitted by the mobile stations in the same packets in which they report connectivity information used in selecting the master.

An aspect of some embodiments of the invention relates to a method of compression of identities of a sub-group of elements (e.g., mobile stations) from a group of predetermined elements. The method includes defining a 1:1 correlation between each sub-group of r out of n elements and a number representing the sub-group. The sub-group is represented by encoding the number of elements in the sub-group and the number representing the sub-group.

There is therefore provided in accordance with an exemplary embodiment of the invention, a method of managing data transmission in a mesh-topology ad-hoc network, comprising:

(a) transmitting management information by a plurality of mobile stations of the network;

(b) selecting a mobile station to serve as a master, responsive to the transmitted management information;

(c) transmitting to the master requests for bandwidth;

(d) allocating bandwidth by the master, responsive to the requests; and (e) forwarding the bandwidth allocation to the mobile stations of the network.

Optionally, transmitting the management information comprises transmitting by each mobile station of the network in a predetermined time slot of the mobile station, not allocated by the master.

Optionally, transmitting the management information comprises transmitting information on connectivity between mobile stations of the network. Optionally, transmitting the management information comprises transmitting in packets at least some of which include also requests for bandwidth. Optionally, the method includes selecting mobile stations to serve as relays in a backbone tree of the network, which relays forward data from a data source throughout the network. Optionally, selecting the master comprises selecting the master from the relays. Optionally, selecting relays comprises selecting at least three, five or even seven relay units. In some embodiments of the invention, ten relay units or even more are used. The larger number of relays used allows covering a larger area with relay units. On the other hand, too many relay units in those embodiments in which only one relay unit transmits at any single time, may limit the achievable bandwidth to a very low level and/or not allow transmission of voice signals through all the relay units within a short enough time that allows real time speech communications. Accordingly, in some embodiments of the invention, fewer than 20, 15 or even fewer than 12 or 10 relay units are selected.

Optionally, transmitting requests for bandwidth to the master comprises transmitting the requests by each of the mobile stations and forwarding the requests by each of the relay units except for the master in an order from farthest from the master to the master.

Optionally, in a first stage, performed before selecting the relays, each mobile station transmits requests for bandwidth, and in a second stage performed after the selection of the relays, each relay, in a predetermined order leading from remote relays to the master, forwards to a neighboring relay information on bandwidth requests received from neighboring mobile stations and other relays. Optionally, forwarding the bandwidth allocation to the mobile stations of the network comprises transmitting the allocation by each of the selected relays. Optionally, selecting the master comprises selecting responsive to connectivity information of the network. Optionally, allocating the bandwidth comprises allocating such that at any single time only a single mobile station throughout the network is allowed to transmit.

Optionally, the method includes repeating (a) to (e) at a rate of at least once a minute or even once a second. Optionally, allocating bandwidth by the master comprises allocating in each repetition of (a) to (e) bandwidth for transmission of data by a mobile station serving as a source of the data and to a plurality of mobile stations for repeating the data.

Optionally, forwarding the bandwidth allocation comprises forwarding a message explicitly identifying the source and at most one of the mobile stations allocated bandwidth for repeating the data. Optionally, transmitting the management information comprises transmitting by all the mobile stations on a single channel.

Optionally, allocating bandwidth by the master comprises allocating bandwidth on the single channel. Optionally, selecting the master is performed after transmitting to the master the requests for bandwidth.

There is further provided in accordance with an exemplary embodiment of the invention, a method of transmitting data in a mesh-topology ad-hoc network, comprising:

(a) transmitting management information by a plurality of mobile stations of the network;

(b) determining a connectivity map of the network responsive to the management information, the network having a smallest end-to-end path of at least five mobile stations; and (c) allocating bandwidth suitable for real time broadcast of voice signals throughout the network, responsive to the determined connectivity map.

Optionally, the method includes selecting mobile stations to serve as relays in a backbone tree of the network, responsive to the connectivity map. Optionally, selecting the relays comprises selecting at least five relays. Optionally, allocating the bandwidth comprises allocating bandwidth within less than 250 milliseconds, to a source of real time voice and to all the relays.

There is further provided in accordance with an exemplary embodiment of the invention, a method of transmitting data in a mesh-topology ad-hoc network, comprising:

(a) transmitting management information by a plurality of mobile stations of the network;

(b) selecting a mobile station to serve as a master, responsive to the transmitted management information;

(c) allocating bandwidth, by the master, to a plurality of mobile stations which form a path in the network;

(d) transmitting by the master a packet which reports the bandwidth allocation, the packet explicitly stating fewer than all the mobile stations in the path; and (e) determining the bandwidth allocation by mobile stations other than the master based on the allocation packet from the master and the transmitted management information.

Optionally, transmitting the management information comprises transmitting by each mobile station of the network in a predetermined time slot of the mobile station, not allocated by the master.

Optionally, determining the bandwidth allocation comprises determining a connectivity map of the network responsive to the transmitted management information and determining the bandwidth allocation responsive to the connectivity map. Optionally, determining the bandwidth allocation comprises determining a backbone spanning tree responsive to the connectivity map and determining the backbone spanning tree. Optionally, the packet includes indication of at most two mobile stations from the entire path.

There is further provided in accordance with an exemplary embodiment of the invention, a method of managing a mesh-topology ad-hoc network, comprising:

(a) determining a number of mobile stations in the network;
(b) configuring each of the mobile stations with the number of mobile stations in the network;
(c) setting a cycle time for transmission in the network; and
(d) assigning a slot in each cycle to each of the mobile stations, in advance for a plurality of cycles.

Optionally, the assigned slots consume at least 10% of each cycle. Optionally, the method includes transmitting management information in the assigned slots. Optionally, the management information comprises requests for bandwidth for data transmission. Optionally, the management information comprises connectivity information of the network. Optionally, data is not transmitted in the assigned slots. Optionally, the cycles have a duration of less than 600 milliseconds or even less than 300 milliseconds.

Optionally, the slots assigned to a mobile station are assigned in the same location in each cycle. Optionally, the slots are assigned before the mobile stations are used in a current session for which the number of mobile stations are determined.

There is further provided in accordance with an exemplary embodiment of the invention, a method of communicating in a mesh-topology ad-hoc network, comprising assigning slots to specific mobile stations of the network for transmission without contentions; and transmitting both management information and data in the assigned slots, such that at least 90% of the management information and at least 90% of the data are transmitted in the assigned slots. Optionally, the mobile stations do not have provisions for handling contentions in transmissions of the network. Optionally, assigning the slots comprises assigning at least some of the slots by a dynamically selected master. Optionally, assigning the slots comprises pre-assigning at least some of the slots.

There is further provided in accordance with an exemplary embodiment of the invention, a method of managing a mesh-topology ad-hoc network, comprising determining, in each of the mobile stations of the network, connectivity information of the entire network; and periodically transmitting by each of the mobile stations a packet including connectivity information of one or more of the mobile stations of the network, but less than all the mobile stations of the network.

Optionally, the periodic transmission is performed at a predetermined cycle rate. Optionally, periodically transmitting the packet comprises transmitting connectivity information only of mobile stations whose information was transmitted less than a predetermined number of times since it was last updated. Optionally, periodically transmitting the packet comprises transmitting in a packet of a predetermined size and selecting the connectivity information to be transmitted responsive to the size of the packet.

Optionally, selecting the connectivity information to be transmitted comprises selecting according to an extent of a difference between its currently managed connectivity information and the connectivity information already transmitted. Optionally, periodically transmitting the packet comprises transmitting for at least one mobile station information on the connection of the mobile station to substantially all the other mobile stations in the network.

Optionally, the method includes using the connectivity information to determine a backbone tree of the network. Optionally, periodically transmitting the packet comprises managing by each mobile station a matrix indicating for each two mobile stations of the network whether they directly communicate, and the packet includes portions of the matrix recently updated.

There is further provided in accordance with an exemplary embodiment of the invention, a method of transmitting data in a mesh-topology ad-hoc network, comprising:

(a) transmitting management information by a plurality of mobile stations of the network;
(b) transmitting requests for bandwidth;
(c) selecting a mobile station to serve as a master, responsive to the transmitted management information, after the requests for bandwidth were transmitted; and
(d) allocating bandwidth by the master, responsive to the requests.

Optionally, the requests for bandwidth are transmitted with the management information in same packets.

There is further provided in accordance with an exemplary embodiment of the invention, a method of compressing identities of a sub-group of elements for a predetermined group including n elements, comprising defining a 1:1 correlation between each sub-group of r out of n elements and a number representing the sub-group, where r is a number greater than or equal to 2, providing a sub-group, encoding the number of elements in the sub-group and encoding the number representing the sub-group in the defined correlation.

Optionally, the elements comprise mobile stations. Optionally, r is greater than 4. Optionally, the numbers representing the sub-groups include a minimal number of bits required to represent all the possible sub-groups.

There is further provided in accordance with an exemplary embodiment of the invention, a method of real time voice communication between users of an ad hoc network, in which each user has a mobile station including a transceiver adapted for communicating with the mobile stations of the other users and a human interface adapted to provide signals received from other mobile stations to the user in a human tangible form, comprising receiving first voice signals from a human user, by a first mobile station, transmitting the first voice signals to a second mobile station, through one or more intermediate mobile stations serving as relays for the first voice signals, receiving second voice signals from a human user, by the second mobile station; and transmitting the second voice signals to the first mobile station, through one or more intermediate mobile stations serving as relays for the second voice signals. The first and second signals are optionally transmitted in accordance with a predetermined scheme which ensures that the first voice signals reach the second mobile station and the second signals reach the first mobile station within a short period which allows a feeling of real time communication between the users of the first and second mobile stations.

Optionally, the transceivers of the mobile stations are substantially functionally identical. Optionally, transmitting the first voice signals to the second mobile station comprises transmitting along a path of mobile stations selected before the signals are transmitted by the first mobile station.

Optionally, transmitting the first voice signals through one or more intermediate mobile stations comprises transmitting by each of the intermediate mobile stations at a respective time selected before the first voice signals are transmitted by the first mobile station. Optionally, the first and second signals are transmitted in accordance with a predetermined scheme which ensures that the first voice signals reach the second mobile station within less than 240 milliseconds.

Optionally, the one or more intermediate mobile stations serving as relays for the first voice signals are selected based on network connectivity information periodically exchanged between the mobile stations. Optionally, transmitting the first voice signals through one or more intermediate mobile stations comprises transmitting through at least three intermediate mobile stations. Optionally, transmitting the first voice signals through one or more intermediate mobile stations comprises transmitting by all the intermediate mobile stations on a same communication channel.

There is further provided in accordance with an exemplary embodiment of the invention, a mobile station, comprising a transceiver adapted to exchange control and data signals with other mobile stations, a human interface adapted to present signals received by the transceiver in a human tangible form and adapted to receive human signals for transmission by the transceiver; and a processor adapted to periodically receive management information through the transceiver, to select a mobile station to serve as a master responsive to the received management information, to generate, for transmission by the transceiver, requests for bandwidth for data received through the human interface, to receive from the master bandwidth allocations and to manage transmission of data from the human interface in the allocated bandwidth.

Optionally, the human interface comprises a microphone and a speaker. Optionally, the processor is adapted to operate as the master and allocate bandwidth responsive to requests, when it determines that it should be the master. Optionally, the processor is adapted to periodically transmit through the transceiver information on connectivity of a network to which the mobile station belongs. Optionally, the processor is adapted to transmit the information on connectivity of the network in each cycle of a cycle scheme repeating at a rate of at least once a second. Optionally, the processor is adapted to transmit the information on connectivity of the network in a substantially same relative time in each cycle of the cycle scheme. Alternatively, the processor is adapted to transmit the information on connectivity of the network in different relative times in different cycles of the cycle scheme.

BRIEF DESCRIPTION OF THE DRAWINGS

Exemplary non-limiting embodiments of the invention will be described with reference to the following description of the embodiments, in conjunction with the figures. Identical structures, elements or parts which appear in more than one figure are preferably labeled with a same or similar number in all the figures in which they appear, and in which.

DETAILED DESCRIPTION OF EXEMPLARY EMBODIMENTS

Figure 1:
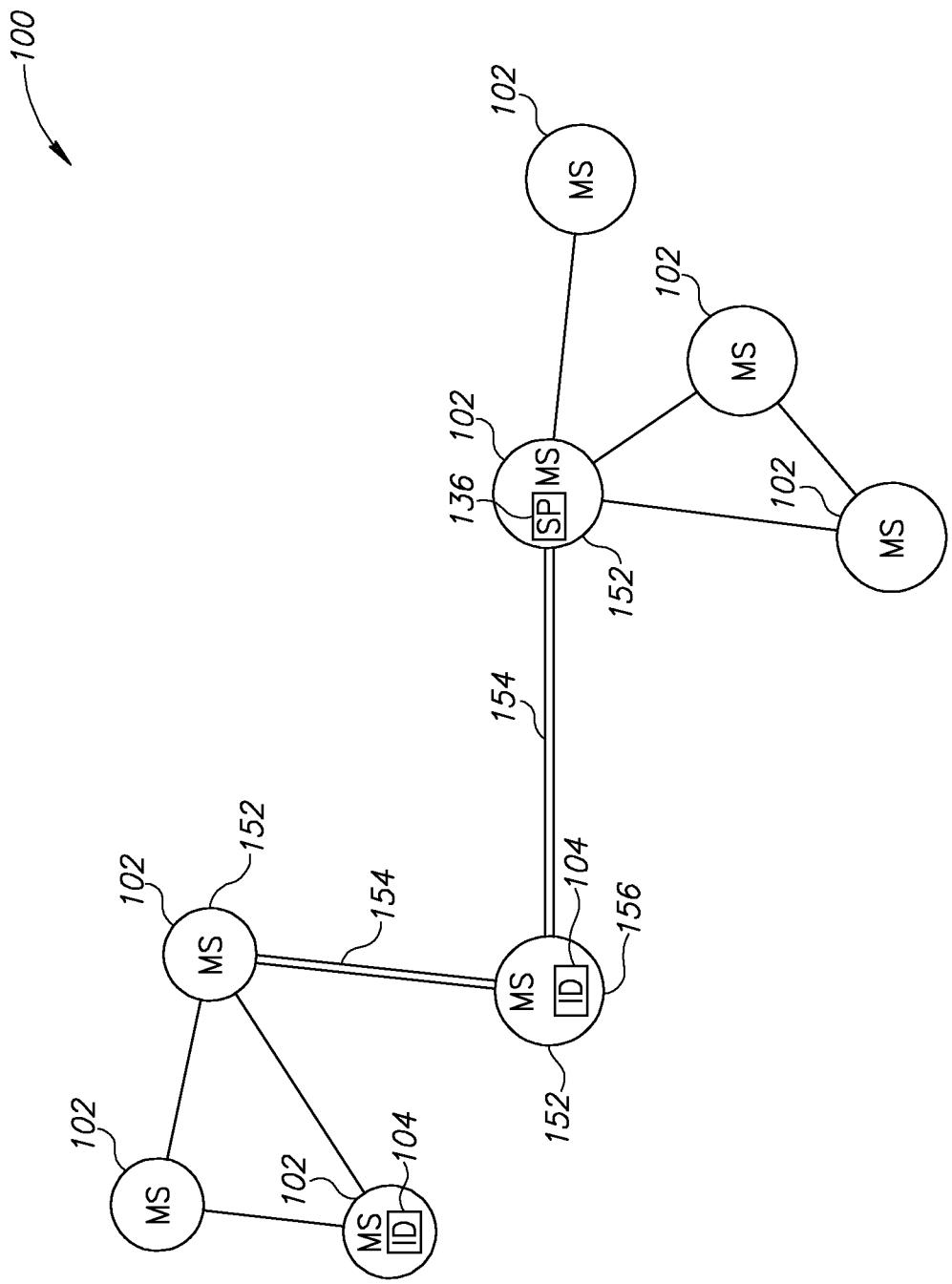
FIG. 1 is a schematic illustration of a peer to peer network, in accordance with an exemplary embodiment of the invention.

FIG. 1 is a schematic illustration of a peer to peer network 100, in accordance with an exemplary embodiment of the invention. Network 100 is formed of a plurality of mobile stations (MS) 102, which optionally include microphones and speakers for real time communication of speech. Alternatively or additionally, mobile stations 102 include input pads and/or displays for transmission of text messages. Further alternatively or additionally, mobile stations 102 have any other input and/or output interfaces known for wireless transceivers, such as cellular telephones, walkie-talkies and personal communicators.

Optionally, mobile stations 102 are all identical units with same processing power. Alternatively, mobile stations 102 may have different characteristics, although the management of transmissions within network 100 is performed, for simplicity, without relation to the differences between the mobile stations. Further alternatively, the differences between the mobile stations 102 are taken into account in the management of communications within network 100, for example as discussed below.

Each mobile station 102 optionally has a unique ID 104, which is permanently assigned to the mobile station (e.g., configured at the time of manufacture) or is assigned for a limited period, for example for the duration of use on a mission. In some embodiments of the invention, in preparation of mobile stations 102 for use in a mission, for example as communication units for a rescue team in a disaster area or a research team in a remote area, each mobile station 102 is configured with the identity of the other mobile stations 102 participating in network 100 during the mission.

Mobile stations 102 may be dedicated only for use in peer to peer network 100 or may be used for other tasks, such as communicating through a network external to network 100. Some or all of mobile stations 102 may be adapted to perform other tasks, such as providing time and/or location information (e.g., serving as a clock and/or GPS). In some embodiments of the invention, even if mobile stations 102 include GPSs, the protocols of management of network 100 do not use geographical position information, for simplicity.

Communication Channel

In some embodiments of the invention, all of mobile stations 102 communicate with each other over a single channel, e.g., a single frequency channel or a single code channel, so that the mobile stations are not required to switch between channels and their hardware can be relatively simple. Furthermore, having all transmissions between mobile stations 102 on a single channel makes reconnecting of a mobile station 102 to transmissions of the network, in cases in which it was out of reach for a while, relatively simple.

The transmissions on the single channel are optionally divided into repeated "transmission cycles", as described below with reference to FIG. 2. Each cycle optionally comprises a management portion in which mobile stations 102 exchange management (e.g., connectivity) information and have a chance to request bandwidth for data transmission, and a data portion in which mobile stations 102 that receive a bandwidth allocation, transmit data.

Using the management information exchanged in the management portion, several mobile stations 102 are selected to operate as relay units (marked additionally by 152 in FIG. 1), which form a spanning backbone tree of network 100. Relay units 152 are connected by links 154, which belong to a backbone of network 100. The term spanning backbone tree (known in the art of graphs also as a minimal connected dominating set) refers to a group of mobile stations 102 and links 154, in which any two mobile stations 102 can communicate with each other via a single path. In addition, each mobile station 102 not in the backbone tree can communicate directly with at least one of relay units 152. It is noted that if one or more clusters of mobile stations 102 cannot communicate with any of the mobile stations 102 in another cluster of mobile stations 102, each of the clusters will have its own backbone tree.

Optionally, all of mobile stations 102 manage connectivity (layout) information on the entire network 100, and perform independent selection of relay units 152 and formation of a spanning tree. In most cases, all of mobile stations 102 are expected to reach the same selection of relay units 152 and spanning tree, due to the repeated exchange of connectivity information between mobile stations 102. Correction measures to be performed when different mobile stations 102 select different relay units 152, in a manner which disrupts the communications in network 100, are described below.

Cycle Division

Figure 2:
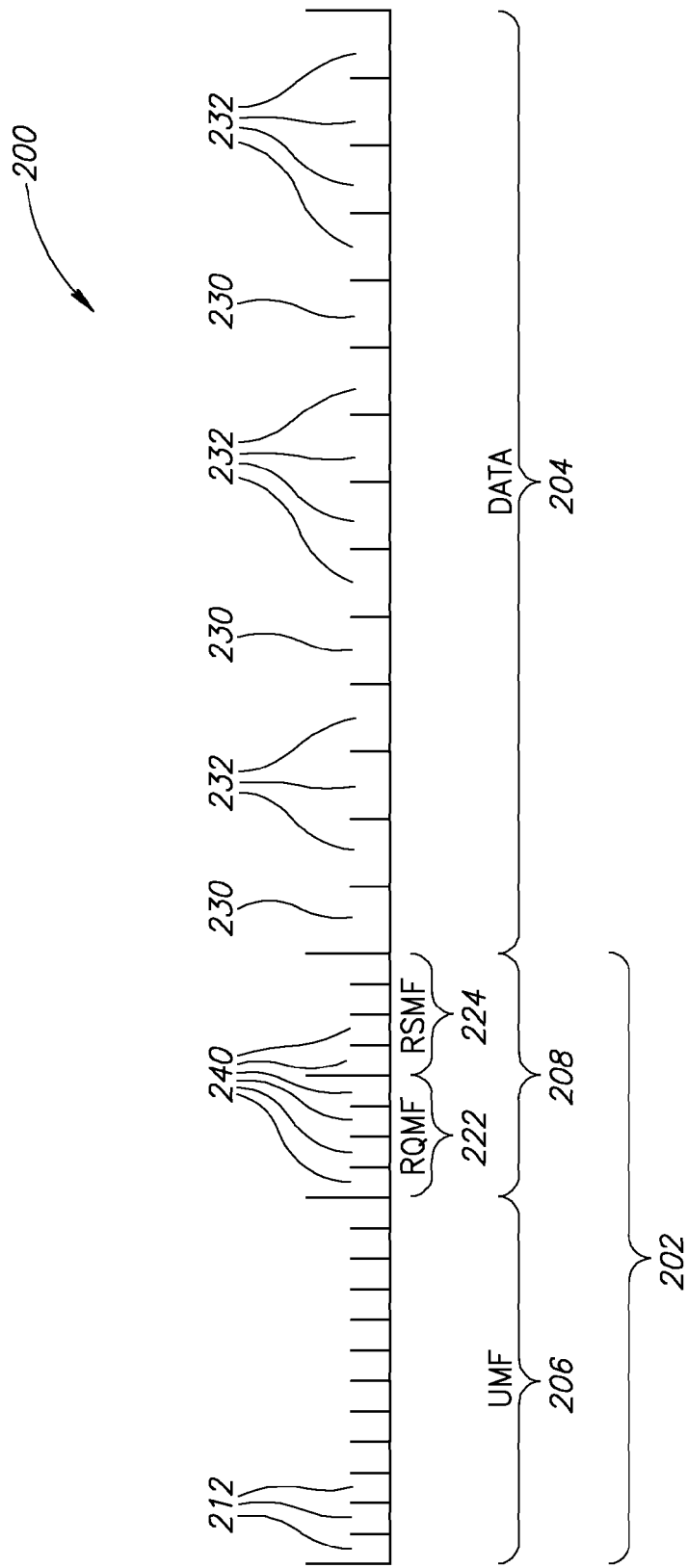
FIG. 2 is a schematic illustration of a transmission cycle of a peer to peer network, in accordance with an exemplary embodiment of the invention.

FIG. 2 is a schematic illustration of a transmission cycle 200 in network 100, in accordance with an exemplary embodiment of the invention.

Each cycle 200 optionally comprises a management frame 202 followed by a data frame 204. Management frame 202 optionally includes a unit management frame (UMF) 206 and a relay sub-portion 208. Unit management frame 206 is divided into N slots 212, one slot 212 for each of N mobile station 102 in network 100. During unit management frame 206, mobile stations (MS) 102 are in a UMF state, during which each mobile station 102 transmits, in its respective slot 212, a management information packet that includes at least partial information on its "perception" of the connectivity of network 100, and its bandwidth needs for the current cycle 200. The management information transmitted by each MS 102 is selected using methods described hereinbelow. Each mobile station 102 listens to the transmissions in slots 212 of other MSs 102 and updates its own perception of the connectivity of network 100 responsive thereto. In addition, the mobile station 102 keeps track of the requests for bandwidth transmitted by other mobile stations 102, in case mobile station 102 is selected as a relay unit 152 and needs to forward the requests to a mobile station 102 selected to operate as a master 156 and allocate bandwidth to the mobile stations.

After the UMF state, mobile stations 102 select mobile stations 102 which serve as relay units 152, based on their current perception of the connectivity of the network. Each mobile station 102 then determines whether it belongs to the backbone tree, i.e., is a relay unit 152. Each of relay units 152 selects a relay unit to serve as a master of the network. A transmission order for relay unit 152 is determined according to the location of master 156 (FIG. 1) in the spanning tree. In some embodiments of the invention, the selection of relay units 152 and master 156 are performed separately by each mobile station 102, based on predetermined rules and the structure of the network as perceived by the mobile station 102. In some cases, different perceptions of network 100 by different mobile stations 102, cause them to select different backbone trees for the network. Measures taken to prevent such selection of different backbone trees to cause problems in communication are described hereinbelow.

After selecting relay units 152 and master 156, mobile stations 102 move to a RQMF state in which bandwidth requests are provided by relay units 152 in a request management frame (RQMF) 222. In the RQMF state, each relay unit 152 transmits, in its turn, a list of the bandwidth requests it is aware of, including its own requests, as received during unit management frame 206.

The order of transmission is optionally determined such that the mobile stations 102 farther from the selected master transmit their list before the closer mobile stations, such that the closer mobile stations include the lists of the farther mobile stations 102 in their list. Thus, the master 156 receives the requests of all the mobile stations, during request management frame 222. Each relay unit receives the transmissions of its neighboring relay units and accordingly updates the data it is to transmit, as described in detail below. During the RQMF state, the mobile stations 102 that did not determine that they are relay units optionally take no action. Optionally, in order to conserve battery power, the mobile stations 102 that are not relay units, shut down for the RQMF state. Alternatively, the mobile stations 102 that are not relay units listen to the transmissions of the relay units in order to verify that their perspective of the connectivity of the network is correct.

After the RQMF state, the master 156 allocates the bandwidth of data frame 204 between the mobile stations 102, optionally according to predetermined allocation rules. The mobile stations 102 then move to a RSMF state, in which the bandwidth allocation is transmitted from the master through the backbone tree. Each relay unit 152 transmits in its respective slot in a response management frame (RSMF) 224, in a reverse order relative to the order in request management frame 222, the allocation from the master. Response management frame 224 is optionally divided into K−1 slots 240 and request management frame 222 is optionally divided into K slots 240, where K is the number of relay units 152 in the backbone tree. The mobile stations 102 that receive the transmitted allocations use the allocation information in determining whether and when they are to transmit data during data frame 204.

After transmission of the allocations in response management frame 224, mobile stations 102 move to a data transmission state, in which mobile stations 102 receiving bandwidth allocations in the current cycle 200 transmit data (e.g., speech, text) packets during data frame 204. Optionally, after each transmission by a mobile station 102 which is a source of the data, the relay units 152 retransmit the data throughout network 100.

In some embodiments of the invention, each mobile station 102 allocated bandwidth is assigned a slot 230 for transmission of its data and K (if the source is not a relay unit) or K−1 (if the source is a relay unit) forwarding slots 232 for forwarding of the data by relay units 152.

It is noted that the organization of cycle 200 allows transmitting data using relay units 152 selected responsive to connectivity information received in the same cycle 200 in which the data is transmitted. Thus, the connectivity information is updated very fast, reducing the percentage of data lost due to changes in the connectivity in network 100.

Timing

In some embodiments of the invention, cycles 200 have a predetermined length which ensures that the delay between the generation of voice samples and their reception by all the mobile stations will not interfere with the flow of conversation. In an exemplary embodiment of the invention, cycle 200 is not longer than 250 milliseconds, optionally not longer than 220 milliseconds. If, for example, a channel of 1 Megabit per second is used for transmission, each cycle is optionally suitable for transmission of up to 220,000 bits.

UMF Timing

Optionally, all of slots 212 in a single cycle 200 are of a same length, allowing all mobile stations 102 an equal chance to distribute their connectivity information. In some embodiments of the invention, all cycles 200 in a single mission have a same number of slots 212, according to the number of mobile stations 102 going out on the mission.

In some embodiments of the invention, slots 212 have a predetermined length in all missions, such that the length of unit management frame 206 is directly determined by the number of mobile stations 102 included in network 100 of the specific mission. Alternatively or additionally, unit management frame 206 has a predetermined length and the length of slots 212 is determined as a function of the number of mobile stations 102 in network 100 for the specific mission. Further alternatively or additionally, the length of slots 212 is determined as a non-linear function (e.g., a step function) of the number of mobile stations 102 in network 100. For example, for up to 30 mobile stations 102 in network 100 a first length is used for slots 212, for up to 99 mobile stations a second, shorter, length is used, and for more than 99 mobile stations 102 an even shorter length is used.

The size of slot 212 is optionally relatively small, so as not to waste the bandwidth of cycle 200 on management data, and thus leave maximal room for data in data frame 204. In some embodiments of the invention, slot 212 has a data capacity of less than 2000 bits, less than 1500 bits or even less than 1000 bits. When network 100 is expected to be relatively stable, slot 212 optionally has a data capacity of less than 600 bits or even less than 400 bits. It is noted, however, that slot 212 is optionally not too small, so that it can carry data of at least one, two or even four rows of RMAP 402 (FIG. 3), described below. In some embodiments of the invention, slots 212 are greater than 500 bits, 800 bits or even greater than 1000 bits.

Relay Frame Size

Optionally, the size and distribution of the bandwidth of relay sub-portion 208 is determined by each of mobile stations 102 based on its perception of the connectivity of network 100 after at least most of unit management frame 206 and before relay sub-portion 208. This reduces the bandwidth utilization of sub-portion 208, as its size is adapted to the network conditions during each cycle 200.

The size of relay sub-portion 208 optionally varies between cycles 200, according to the number of mobile stations 102 in the backbone tree. In some embodiments of the invention, for simplicity, slots 240 in relay sub-portion 208 have the same length in all cycles 200, such that the length of relay sub-portion 208 is a linear function of the size of the backbone tree. Alternatively, slots 240 vary in size according to the size of the backbone tree. In an exemplary embodiment of the invention, the sizes of slots 240 increase with the size of the backbone tree, in order to make room for the larger amounts of information accumulated by relay units 152 close to the master. Alternatively or additionally, the sizes of slots 240 increase with the number of mobile stations 102 in network 100, as the amount of information which needs to be transferred to the master 156 depends on the number of mobile stations 102 in the network. Further alternatively, the sizes of slots 240 decrease with the number of slots 240 in relay sub-portion 208, in order to keep the size of relay sub-portion 208 reasonable.

In some embodiments of the invention, all of slots 240 in a single cycle have the same size. Alternatively, different slots 240 in a single cycle have different sizes, for example, according to the proximity of their corresponding relay units 152 to the master. In an exemplary embodiment of the invention, slots 240 of RQMF 222 closer to the master are larger, in order to accommodate for the additional data they collect from a larger number of mobile stations 102.

Slots 240 are optionally of the same size as slots 212. Alternatively, slots 240 may be smaller or larger according to their bandwidth needs. In some embodiments of the invention, slots 240 have a capacity of less than 2000 bits or even less than 1000 bits.

Alternatively to determining the size and distribution of bandwidth in relay sub-portion 208 in each cycle 200, the size of relay sub-portion 208 and/or its partitioning into slots 240 is predetermined for an entire mission and/or is changed only by the master 156 sending instructions to all mobile stations 102. While using a predetermined amount of bandwidth for relay sub-portion 208 may be somewhat wasteful in bandwidth, the use of a predetermined size and/or partitioning of relay sub-portion 208, reduces the chances of errors due to different perceptions of the network connectivity by different mobile stations 102.

Data Frame Size

The size of data frame 204 is optionally determined as the remaining bandwidth of the cycle 200 which was not assigned to unit management frame 206 and to relay sub-portion 208. Alternatively or additionally, a maximal portion of cycle 200 to be used by unit management frame 206 and relay sub-portion 208, is determined according to a minimal amount of bandwidth required for data transmission. For example, a minimal amount of bandwidth required for transmission of one, two or three voice chunks (audio frames) in each cycle 200 may be reserved for data frame 204. The remaining portion of the cycle 200 is divided between unit management frame 206 and relay sub-portion 208 and their slots are adjusted accordingly.

If voice data is encoded using 9600 bps, a 220 millisecond cycle requires for a single channel, transmission of about 2112 bits of voice data. If voice data is encoded using 4800 bps, a 220 millisecond cycle requires transmission of about 1056 bits of voice data. Optionally, error correction bits are added, requiring for example between 25-100% additional bits. In addition, each packet transmitted by a different mobile station 102 optionally includes delimiter bits (e.g., 50 barker bits which identify the beginning of the packet and 50 PTT (permission to talk) bits). Thus, each packet transmitted in a slot 230 or 232 requires between about 1500-4500 bits. Setting a predetermined number of data slots 230 in each cycle 200 and a maximal number of relay units 152 in the backbone tree, a minimal data size required for data frame 204 is optionally defined. In an exemplary embodiment of the invention, for a maximal number of ten relay units 152 and a single slot 230 in each cycle 200, a size of at least 47,000 bits is defined for data frame 204. In some embodiments of the invention, less than 50% or even less than 30% of each cycle 200 is used for data frame 204. Alternatively, for example on large channels, over 60% or even over 75% of each cycle 200 is used for data frame 204.

In some embodiments of the invention, all the data transmitted in network 100 is transmitted in packets which include redundancy for error correction and delimiter bits. Optionally, all packets use the same redundancy ratio and the same number of delimiter bits. Alternatively, different packets have different redundancy ratios. Optionally, in accordance with this alternative, data packets transmitted in slots 230 and 232 have relatively low redundancy ratio (e.g., an addition of up to 50% or even up to 30%), while management packets transmitted in slots 212 and/or 240 have high redundancy ratios of at least 60% or even at least 80%. Alternatively or additionally, different mobile stations 102 are assigned different amounts of bandwidth in order to accommodate different redundancy ratios and/or different compression ratios (e.g., a higher quality codec for a mission commander). In some embodiments of the invention, when the master 156 identifies a need to change the redundancy and/or compression ratios, for example when the load on network 100 changes substantially, the master 156 transmits instructions to change the redundancy and/or compression ratios.

Management of Connectivity Information

Referring in more detail to updating connectivity information of network 100 during the UMF state, in some embodiments of the invention, each mobile station 102 transmits in its slot 212 an amount of connectivity data which depends on the size of slot 212. In some embodiments of the invention, the transmitted connectivity information includes information on which mobile stations 102 directly receive the signals transmitted by one or more other mobile stations.

Figure 3:
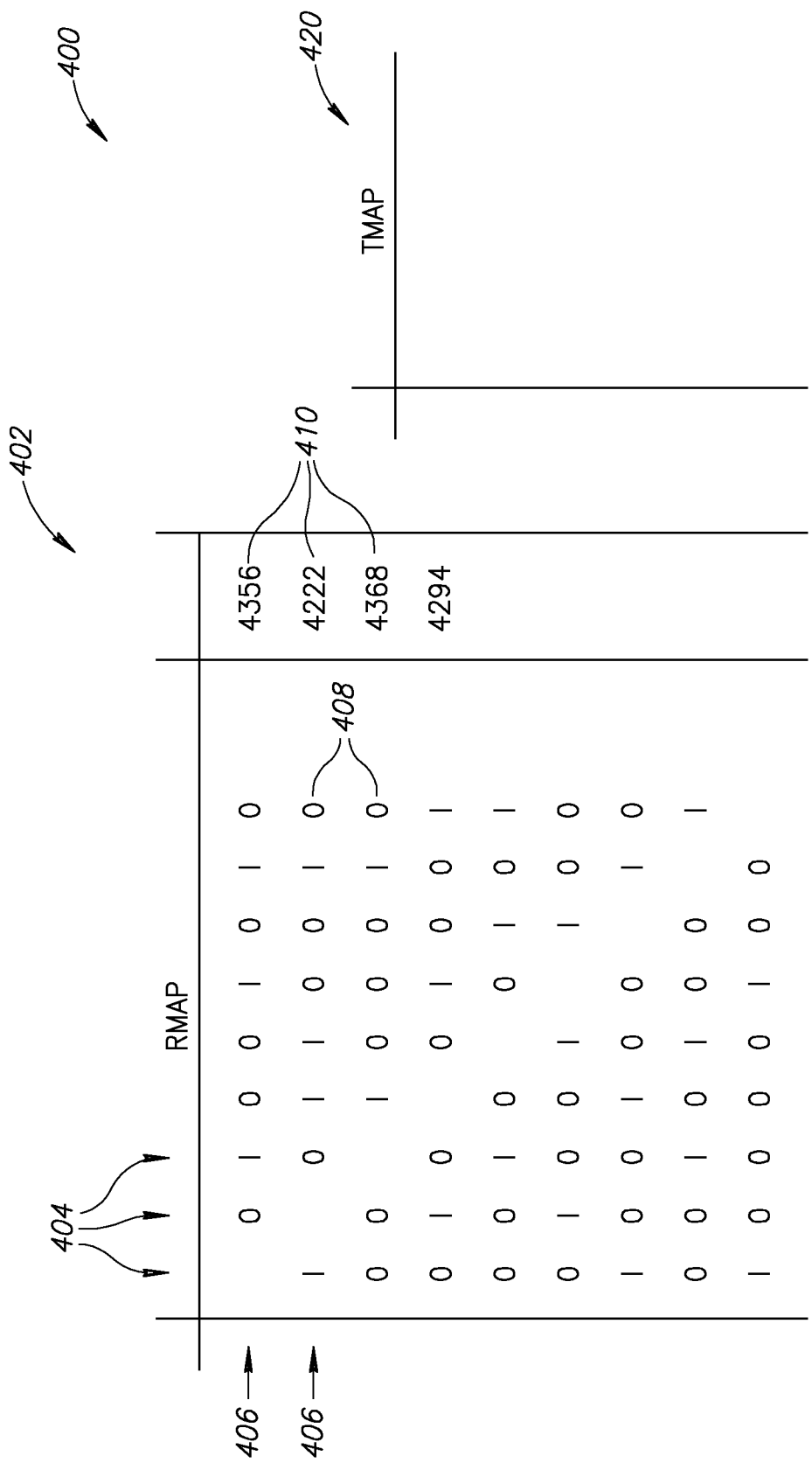
FIG. 3 is a schematic illustration of a data structure stored in each mobile station, in accordance with an exemplary embodiment of the invention.

FIG. 3 is a schematic illustration of a data structure 400 maintained in each mobile station 102, in accordance with an exemplary embodiment of the invention. Each mobile station 102 optionally manages a binary matrix (RMAP) 402 which has a column 404 and a row 406, for each mobile station 102. The number of rows 406 and columns 404 in RMAP 402 is optionally configured into mobile stations 102 when they go out on a mission, according to the number of mobile stations 102 going out on the mission. Without loss of generality, each location 408 in RMAP 402 optionally indicates whether the mobile station (MS) 102 corresponding to the row 406 of the location 408 receives signals transmitted by the mobile station 102 corresponding to the column 404 of the location 408. In some embodiments of the invention, each location 408 stores a binary value, which indicates whether the signals are received at least at a predetermined level. Alternatively, each location 408 receives a value which can receive at least 4 or even 16 values, which indicates the quality of the received signals.

Each row 406 is optionally associated with a time value 410 which indicates the latest time at which the row was updated. Alternatively or additionally, each column 404 is associated with a time value. Further alternatively, a plurality of two or more rows are included in a single sub-portion, with a single time value, in order to limit storage requirements. Further alternatively, any other partitioning of RMAP 402 may be used for assigning corresponding time values. In some embodiments of the invention, each location 408 is associated with a time value.

In some embodiments of the invention, time value 410 is a time stamp taken from an internal clock of the mobile station. Alternatively, the time value 410 is a cycle number of cycle 200. Further alternatively, time value 410 is a version number which changes each time the value of the row (or other portion of RMAP 402) changes. In some embodiments of the invention, time value 410 is generated by the mobile station 102 corresponding to the row. Optionally, in these embodiments, when the mobile station 102 transmits updated connectivity information on the mobile station 102 from which it receives signals, the mobile station 102 transmits the connectivity information with the time value 410. Mobile stations receiving the row 406, optionally store the row along with the time value 410. When the row 406 is retransmitted to other mobile stations 102, the same time value 410 provided by the original mobile station 102 generating the row 406 accompanies the row.

Optionally, the time value 410 occupies as small a field as possible, in order to reduce the number of bits its transmission requires in the UMF packets transmitted in slots 212. Possibly, less than 20, less than 15 or even less than 12 bits are used. Optionally, a sufficiently large number of bits is used, such that there is no mix-up when the time value raps around. Possibly, more than 6, more than 10 or even more than 15 bits are used. In some embodiments of the invention, the number of bits representing the time value is configured before each mission, based on the expected speed of movement of the mobile stations 102 during the mission and/or responsive to the number of mobile stations participating in the mission. For example, for a large number of mobile stations, fewer bits may be used for the clock in order to have as much as possible room for data.

In some embodiments of the invention, each mobile station 102 also manages a transmitted matrix (TMAP) 420, similar to RMAP 402, which states the network connectivity information that the mobile station 102 has already transmitted to its neighbors.

Update of Rows

During data frame 204, each mobile station 102 updates its RMAP 402, by changing the row corresponding to the mobile station 102 managing the RMAP 402. For each packet received correctly by the mobile station 102, the location 408 in the column 404 corresponding to the mobile station 102 transmitting the packet and the row 406 corresponding to the mobile station receiving the packet is optionally set to a '1' bit to indicate that transmission was successful.

In some embodiments of the invention, the updating of locations 408 of the row corresponding to the receiving mobile station is performed based on both data and management packets. Alternatively, row 406 is updated only based on UMF packets, which are transmitted at a high rate, e.g., each mobile station 102 transmits a UMF packet in each cycle 200. Further alternatively, row 406 is updated only based on data packets as it is data that needs to pass between the mobile stations. Further alternatively or additionally, row 406 is updated based on reception of relay packets transmitted during relay sub-portion 208.

Optionally, for each packet which is expected to be transmitted but is not received, the mobile station sets the corresponding location in RMAP 402 to a '0' value. For example, mobile stations 102 are optionally configured with a pre-allocation of slots 212 indicating a correspondence between each slot 212 and a corresponding mobile station 102. For each slot 212 in which a packet was not received, the corresponding location 408 in RMAP 402 is optionally set to '0'. In some embodiments of the invention, each mobile station 102 receives the bandwidth allocation of the data frame 204 during the current cycle 200 during relay sub-portion 208. Locations 408 corresponding to mobile stations 102 that were assigned bandwidth but the mobile station did not receive from them signals, are set to a '0' bit, to indicate that the mobile station does not receive signals they transmit. Alternatively or additionally, when a data packet is received with errors, the location intersecting the transmitting mobile station with the receiving mobile station 102 is set to '0'. Possibly, indications of non-reception are also set according to the transmissions during relay sub-portion 208.

In the above description, the change of a value of a location 408 is performed based on a single occurrence of successful reception and/or a single occurrence of unsuccessful reception. In other embodiments of the invention, a plurality of successful and/or unsuccessful transmissions are required in order to determine connection or no connection, in order to avoid changing of the network connectivity due to a short disconnection or reconnection. In an exemplary embodiment of the invention, connection is determined based on a single successful reception and no connection is determined based on at least three consecutive unsuccessful receptions. Alternatively, the same number of successful receptions are required as unsuccessful receptions.

In some embodiments of the invention, locations 408 are not updated to indicate direct connection, unless the signals are received at a sufficiently high signal level and/or signals are received from the same mobile station 102 a plurality of consecutive times. This conservative update method adds to the stability of the network topology data and thus reduces the chances of discrepancies in the selection of relay units between mobile stations of the network. Optionally, if the signal strength of a signal received from a mobile station 102 is above an upper threshold TRH, the mobile station is indicated as being a direct neighbor of the mobile station managing RMAP 402. If the received signals are below a low threshold TRL, the transmitting mobile station is indicated as not being a direct neighbor of the owner of RMAP 402. In cases in which the power level of the received signals is between TRH and TRL, the corresponding location 408 in RMAP 402 is optionally left unchanged, in order to increase the stability of the network. Alternatively or additionally, if signals of a low level, between TRH and TRL are received consecutively a predetermined number of times, location 408 is changed to indicate direct connection.

In an exemplary embodiment, TRL is preset to zero, such that only signals not received at all are not considered in determining connectivity. Alternatively, TRL is set dynamically according to the connectivity of the network. If many mobile stations 102 are connected to each other, TRL may be set to a high level (e.g., more than 3 dB, more than 6 dB or even more than 12 dB) in order to achieve network stability. On the other hand, when the network suffers from fewer connections, a low value of TRL is used, in order to achieve maximal connection. Further alternatively or additionally, the value of TRL used depends on the specific mobile station from which the signals were received. For example, if the specific mobile station was recently out of range of the entire spanning tree of the network, a low TRL is optionally used, in order to join the mobile station to the network.

The upper threshold TRH is optionally set according to the maximal fluctuation level expected in the received signals. In some embodiments of the invention, the upper threshold TRH is set according to the changes in signal value due to body blocking, i.e., due to the orientation of the receiving mobile station. Possibly, TRH is set to be equal to the maximal change in signal value due to body blocking in predetermined tests, e.g., 20 dB. Alternatively, higher or lower values may be used.

The thresholds (e.g., TRL, TRH) as well as the other parameters of the mobile stations 102 may be set at the time of manufacture or may be configured before delivery to a client. Alternatively, the thresholds or other parameters may be configured by a user, optionally, if desired, before each mission.

Optionally, each mobile station 102, manages for each of the other mobile stations a counter of the number of successfully received packets and/or the number of transmissions not received. In some embodiments of the invention, whenever the reception from a specific MS 102 is indicated in RMAP 402 as being successful, the counter is used to count consecutive cases of no-reception, while when RMAP 402 indicates no connection, the counter is used to indicate successfully received packets. Alternatively to a counter of unsuccessful receptions, each mobile station 102 manages for the other mobile stations 102 an indication of the last time a successful transmission was received from the other mobile station. Periodically, the time indications of successful reception are converted into a binary indication of whether the mobile stations are connected, for example by converting all time indications older than a predetermined time into an unconnected value.

Optionally, whenever a value in the row 406 corresponding to the mobile station 102 is changed, for example due to successful reception of a packet, the time value 410 of the row is changed. Alternatively, the mobile station 102 keeps track of whether the row was changed in the current cycle 200 and updates the time value 410 of the row at the end of the cycle if the row changed during the cycle. Further alternatively, the time value 410 is changed only when the content of the row 406 is transmitted. Further alternatively, the time stamp of the row 406 corresponding to the mobile station managing the RMAP 402 is continuously kept at the current time. In some embodiments of the invention, the time stamp 410 of the row 406 that corresponds to the updating mobile station 102 is left empty or is given a special value that indicates that the value is always current. This avoids the need to update the time stamp 410 of the row of the current mobile station 102, all the time. Optionally, a time stamp is added to the row when it is transmitted.

During unit management frame 206, mobile station 102 listens to the connectivity information transmitted from other mobile stations and updates its RMAP 402, if the transmitted data is newer than the data it has in its RMAP 402. In some embodiments of the invention, during unit management frame 206, connectivity information is transmitted with a time value, which is compared by the receiving mobile station to the time stamp it has for the received information.

Management Packet

Referring in more detail to transmitting the unit management frame (UMF) packet in slots 212, in some embodiments of the invention as mentioned above, the transmitted management packet includes an indication of whether the transmitting mobile station 102 needs to transmit data. A discussion of the indications on bandwidth needs is presented below, together with the discussion of allocation of the bandwidth of data frame 204.

In some embodiments of the invention, as mentioned above, the management packets include connectivity data of network 100 as perceived by the mobile station 102 (e.g., as determined from its RMAP 402). Optionally, the connectivity data included in a single packet includes only a partial amount of the connectivity information held by the transmitting mobile station 102. In some embodiments of the invention, the connectivity data included in a single management packet includes less than 50%, less than 20%, or even less than 10% of the connectivity information held by the transmitting mobile station 102. An exemplary method of determining which connectivity data to transmit is described hereinbelow, with reference to FIG. 4.

The UMF packets optionally include other information, such as the battery power level (e.g., indicated by between 2-4 bits) and/or the quality level of reception of signals from each of the neighboring mobile stations. Optionally, the battery power level and/or the reception quality are reported by the relay units 152 in the RQMF state to the master, in order to allow the master to make decisions accordingly, for example selecting a relay to service a mobile station allocated bandwidth. In some embodiments of the invention, the battery power and/or reception quality are used in determining the transmission order in the RQMF and/or RSMF states.

In some embodiments of the invention, the packet includes bits for indicating whether the mobile station 102 has a connection to an external network and/or the type of the external network.

Alternatively or additionally to including the other information in UMF packets along with the connectivity information, some or all of the UMF packets include the other information instead of the connectivity information, for example once every 10 cycles or once every 50 cycles.

In some embodiments of the invention, the UMF packets may be used for transmitting short messages. Optionally, when a mobile station 102 has an urgent message to transmit, the UMF packet carries the urgent message instead of connectivity information. RQMF messages then forward the urgent message throughout network 100. In some embodiments of the invention, mobile stations 102 include a "panic" button, which when pressed instructs the mobile station to transfer data as fast as possible, for example, in UMF packets and/or by indicating high urgency in requesting bandwidth.

Alternatively or additionally, a set of predetermined messages are defined and each message is assigned a short code, for example fitting in a single byte. The short code is transmitted in the UMF packet when a user of the mobile station requests to send one of the predetermined messages. The short code is optionally distributed throughout the network in the RQMF packets, optionally with indication of the identity of the source of the message.

In some embodiments of the invention, the transmitted management packet does not include the identity of the transmitting mobile station 102, as the identity is known from the slot 212 in which the packet is transmitted. Alternatively, the packet includes the identity of the transmitting mobile station 102, to allow for error identification and/or for synchronization of the mobile stations 102 with each other.

Transmission of Connectivity Information

Figure 4:
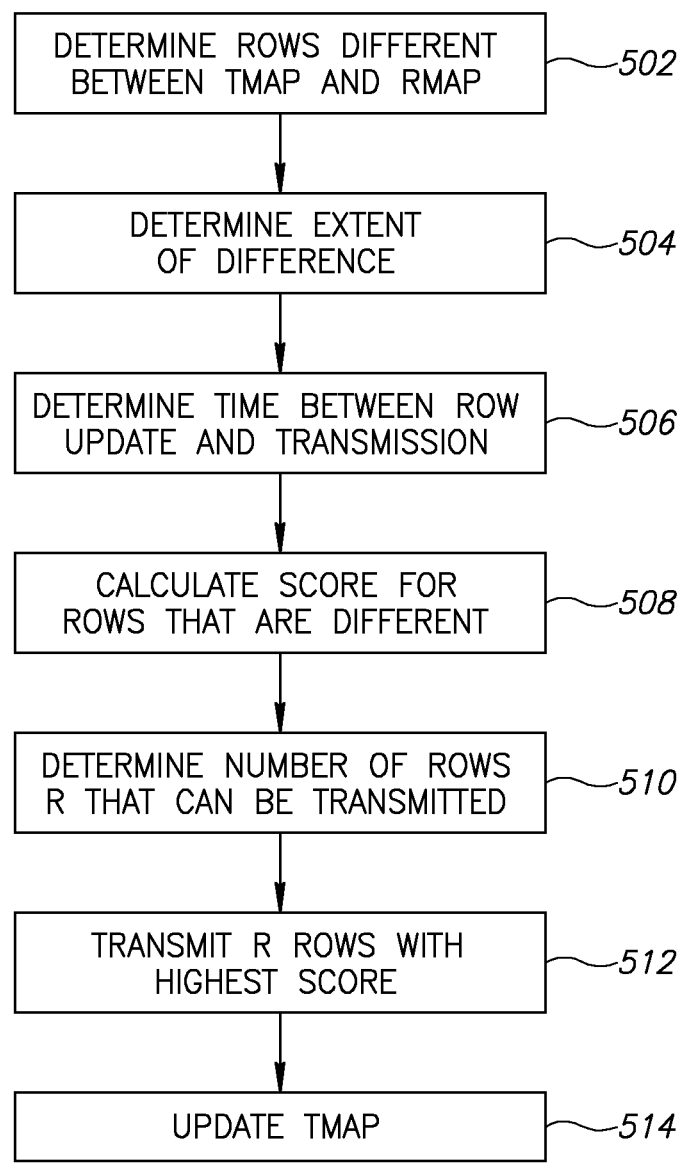
FIG. 4 is a flowchart of acts performed by a mobile station in transmitting connectivity data, in accordance with an exemplary embodiment of the invention.

FIG. 4 is a flowchart of acts performed by a mobile station 102 in transmitting connectivity data in a management packet of a respective time slot 212, in accordance with an exemplary embodiment of the invention. In each cycle 200, toward the time of the slot 212 of the mobile station 102, the mobile station compares the rows 406 of RMAP 402 with the corresponding rows of TMAP 420, to determine (502) which rows have changed relative to previous transmissions. In some embodiments of the invention, an extent of the difference is determined (504).

For each row 406 of RMAP 402, mobile station 102 optionally calculates (508) a score representative of the importance of transmitting the row. According to the size of slot 212, a number R of rows that can be transmitted, is determined (510). The R rows with the highest scores are optionally transmitted (512). Thereafter, TMAP 420 is updated (514) with the contents of the transmitted rows.

In some embodiments of the invention, the calculated (508) score depends on the extent of the difference, such that rows with a high difference are assigned a higher importance score. The extent of the difference optionally includes the number of locations 408 of the row that have in RMAP 402 a different value than in TMAP 420.

Optionally, as indicated by block 506, the importance score of each row also depends on the time stamp of the row. In some embodiments of the invention, rows with older time stamps are given higher scores in order to increase their chance of being finally transmitted. Alternatively, rows with older time stamps are given a lower score, as their information has a higher chance of being out of date. Alternatively or additionally, the importance score depends on the time difference between the last update of each row and its most recent transmission. Optionally, in this alternative, each row in TMAP 420 has a time stamp which indicates the most recent time at which the row was transmitted by the mobile station 102. In some embodiments of the invention, a higher score is assigned to rows that have not been transmitted for a relatively long time.

In some embodiments of the invention, the importance score of each row depends on the number of mobile stations 102 from which the row was received. Optionally, rows received from three or more mobile stations 102 are give a low score, as it is assumed that the row information propagated sufficiently throughout network 100. Further alternatively or additionally, the importance score is assigned at least partially arbitrarily, e.g., randomly.

In an exemplary embodiment of the invention, the score is assigned based on the number of differences between the row in RMAP 402 and in TMAP 420. When the number of differences of two different rows is the same, the row with a larger difference between the time value (e.g., version number) in RMAP 402 and the time version in TMAP 420 is considered having a higher score. Alternatively or additionally, when two rows have equal scores, one of the rows is selected arbitrarily, e.g., randomly.

In another exemplary embodiment of the invention, the row score is assigned as a linear combination of the number of differences in the row between RMAP 402 and TMAP 420 and the time difference of the row between RMAP 402 and TMAP 420.

In some embodiments of the invention, the determination of which rows to transmit is performed solely based on the score. Alternatively, one or more other criteria are taken into account in the determination.

In some embodiments of the invention, the sizes of the compressed row are taken into account. For example, if it is determined that the remaining room in the UMF packet is sufficient for the compressed form of only some of the rows, but is not sufficient for others of rows, a row which can fit in the packet is selected even if it has a low score.

Alternatively or additionally, a mobile station keeps track of the information known by its neighbors, and does not transmit connectivity information that it is clear that is known already by all its neighbors.

Optionally, in accordance with this alternative, each row of RMAP 402 is associated with a record which indicates for each of the neighbors, whether the information received from the neighbor for this row is identical to the content of the row in RMAP 402. In some embodiments of the invention, each time a new value for a row is received, the row is stored in RMAP 402 with an indication of mobile station 102 from which it was received. When the same value of the row is received from another mobile station, the identity of the neighbor is added to the record of the row. When the row is transmitted, all the neighbors at the time of the transmission are optionally added to the record. Alternatively, the neighbors at the time of the transmission of the row are not marked as having the same value of the row, until a transmission is received from them, in case they did not receive the transmission.

The neighbors of the mobile station are optionally known from the RMAP column corresponding to the mobile station managing the RMAP, in which all the mobile stations 102 that receive signals from the managing mobile station are indicated.

Alternatively, instead of managing a single matrix TMAP 420, each mobile station manages a known matrix for each of its neighbors. Optionally, all the matrices are updated based on the rows transmitted by the mobile station and each matrix is updated based on the rows received from the mobile station corresponding to the specific matrix. The use of a matrix for each of the neighbors allows not only knowing whether all the neighbors know the information included in each of the rows of the RMAP 402 but also provides information on the extent to which the row is different from the value of the row in each of the neighbors. In some embodiments of the invention, the scores of the row depend on the extent to which each row is different from the value in some or all of the neighbors.

In some embodiments of the invention, up to a maximal number of matrices are managed according to the expected number of neighbors of most mobile stations (e.g., no more than 8 or 10 matrices) and if a mobile station 102 has more neighbors it manages only a single TMAP 420.

In some embodiments of the invention, when all the information in RMAP 402 was transmitted already, the rows are retransmitted, in case some of the UMF packets were not properly received, for example by a mobile station that moved between the ranges of different mobile stations. Optionally, in accordance with these embodiments, the mobile stations cyclically transmit the rows of RMAP 402, whenever they perform retransmissions. Alternatively or additionally, TMAP 420 includes for each of its rows an indication of the identity of the neighboring mobile stations 102 at the time the row was transmitted. At the time of retransmission, the row scores depend on the extent to which the current neighbors are different from the neighbors at the time of the previous transmission.

In some embodiments of the invention, retransmissions are performed only when a mobile station determines that it has a newly discovered neighboring unit. The retransmission is stopped when all the rows were transmitted, until the next time a new neighbor is identified and/or RMAP 402 changes.

Compression

Figure 5:
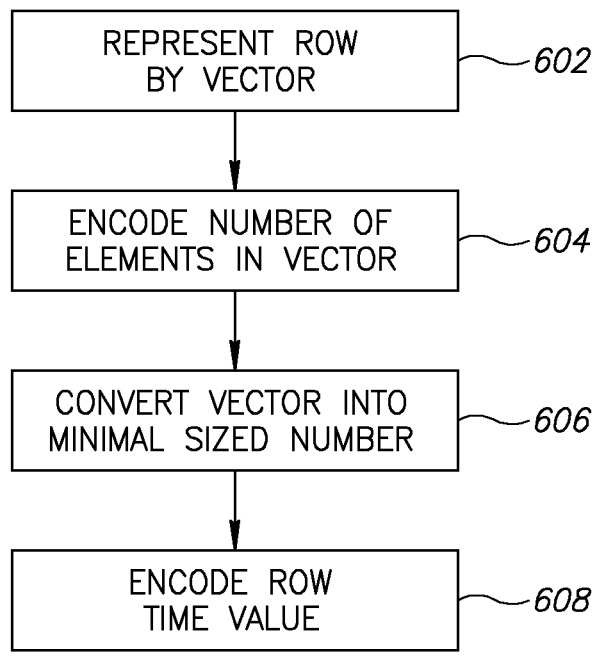
FIG. 5 is a flowchart of acts performed in compressing a row of a connectivity matrix, in accordance with an exemplary embodiment of the invention.

In some embodiments of the invention, rows 406 are transmitted (512) without compression, as sequences of bits, including a number of bits equal to the number of mobile stations 102 in network 100, in the current mission. Each sequence of bits is optionally transmitted with the row number and the time value 410 of the row. In some embodiments of the invention, the rows are also transmitted with error correction bits. Possibly, rows 406 are transmitted compressed, in order to reduce the amount of bandwidth required for their transmission. In an exemplary embodiment of the invention, a compression method as is now described, with reference to FIG. 5, is used. Alternatively, any compression method known in the art, for example a run compression, is used.

FIG. 5 is a flowchart of acts performed in compressing a row 406, in accordance with an exemplary embodiment of the invention. The row is optionally represented (602) by a vector of the positions which include '1' bits, e.g., (5, 10, 17, 23, 56), in which the values are ordered (e.g., from lowest to highest). The number of elements in the vector is encoded (604). A 1:1 function is used to convert (606) the vector into a minimal sized number which corresponds to the vector. The time value of the row is encoded (608).

For each possible number r of members in a vector, the number of possible values of the vector is equal to $$C_r^n = \frac{n!}{r!(n-r)!},$$

where n is the number of mobile stations in network 100. Therefore, all possible values of the vector can be represented by m bits, where m is the smallest integer number larger than $$\log_2\left(\frac{n!}{r!(n-r)!}\right).$$

Any function which converts the vector into a unique number in m bits, may be used for the conversion (606).

In an exemplary embodiment of the invention, the function used is:

$$\text{Index}(v_1, v_2, \ldots v_r) = \sum_{k=1}^{v_1-1} C_{r-1}^{n-k} + \sum_{k=v_1+1}^{v_2-1} C_{r-2}^{n-k} + \sum_{k=v_2+1}^{v_3-1} C_{r-3}^{n-k} + \ldots + \sum_{k=1}^{v_r-1} C_1^{n-k}.$$

which is based on the lexicographic order of the vector in a list of possible vector values. The corresponding decompression is optionally performed by:

$$v_1(\text{index}) = \max(i); \sum_{k=1}^{n-k} C_{r-1}^{n-k} < \text{index}$$

$$v_2(\text{index}) = \max(i); \sum_{k=1}^{v_1-1} C_{r-1}^{n-k} + \sum_{k=v_1+1}^{i-1} C_{r-2}^{n-k} < \text{index}$$

etc.

In some embodiments of the invention, in order to simplify the calculations involved in the compression and decompression, mobile stations 102 are pre-configured with the values of $C_r^k$, for all possible values of r, k maintaining $1 \leq r \leq k \leq n$. Alternatively, only the values that are expected to be used most often according to the number of neighbors mobile stations 102 are expected to have, are prestored. In an exemplary embodiment of the invention, in order to further reduce the amount of storage required, values are stored only for $$1 \leq r \leq \frac{k}{2}.$$

Instead of using a separate group of values for each number of vector members, two or more vector lengths may be included in a single set of values, and instead of encoding the length of the vector, the group of the vector is encoded. Using this alternative increases the average number of bits used for encoding the vector, while decreasing the average number of bits used for encoding the length of the vector.

The length of the vector may be encoded using substantially any method known in the art. Optionally, the length of the vector is encoded using a Huffman code, which uses less bits for vector lengths which are more common.

Alternatively to using the compression method of FIG. 5, the compression is performed by simply stating the numbers of the columns having '1' bits. In some embodiments of the invention, when two or more rows are transmitted together, the column numbers having a '1' bit in at least one of the rows are transmitted. Each column number is accompanied with two bits which indicate whether the column has a '1' in both columns, in the first column or in the second column.

In some embodiments of the invention, the rows to be transmitted are selected as having similar values, such that a compression method based on similarity between two or more rows can achieve a good compression. Thus, the selection of the rows to be transmitted is optionally performed at least partially responsive to the compression method used. For example, a first row is optionally selected according to its score, while one or more additional rows are optionally selected as best compressing with the row selected according to its score. For example, all rows which are a precise shift relative to the selected row are optionally transmitted with it, by simply stating the amount of shift required to move between the rows.

Another compression method involves transmission of the differences of the row relative to one or more previously transmitted versions of the row. The compression optionally states the base version and the columns which have different values relative to the row in the base version. In some embodiments of the invention, a sufficiently old base version is always used, in order to increase the chances that all the mobile stations 102 have the base version. Alternatively or additionally, the mobile stations exchange information on the base versions they carry, in order to ensure use of base versions carried by a large (preferably all) group of mobile stations 102.

Optionally, rows received from other mobile stations 102 are stored in their compressed form, in addition to their storage in the non-compressed form, which is used in selecting relay units. Thus, compression for each row is only performed by a single mobile station 102.

Alternative Transmission Granularity

Alternatively or additionally to managing time values 410 and transmitting connectivity data at a granularity of entire rows, the time values 410 are managed and connectivity data is transmitted at any other granularity, e.g., columns, sets of rows or single matrix locations 408. In some embodiments of the invention, time values 410 are managed at a finer granularity than the granularity at which connectivity data is transmitted. For example, time values 410 are managed separately for each matrix location 408, while only complete rows are transmitted. The selection of the rows to be transmitted optionally takes into account not only the number of changes in the rows but also the time passing since each change.

In some embodiments of the invention, connectivity information is transmitted in different granularity, depending on the number of changes between RMAP 402 and TMAP 420. Optionally, if a row has only one or two locations that changed and there is not enough bandwidth for transmission of all rows that changed, only the specific locations that changed are transmitted. Alternatively, either complete rows or complete columns are transmitted and the selection is performed based on which has more changes that require transmission.

Backbone Tree

Figure 6:
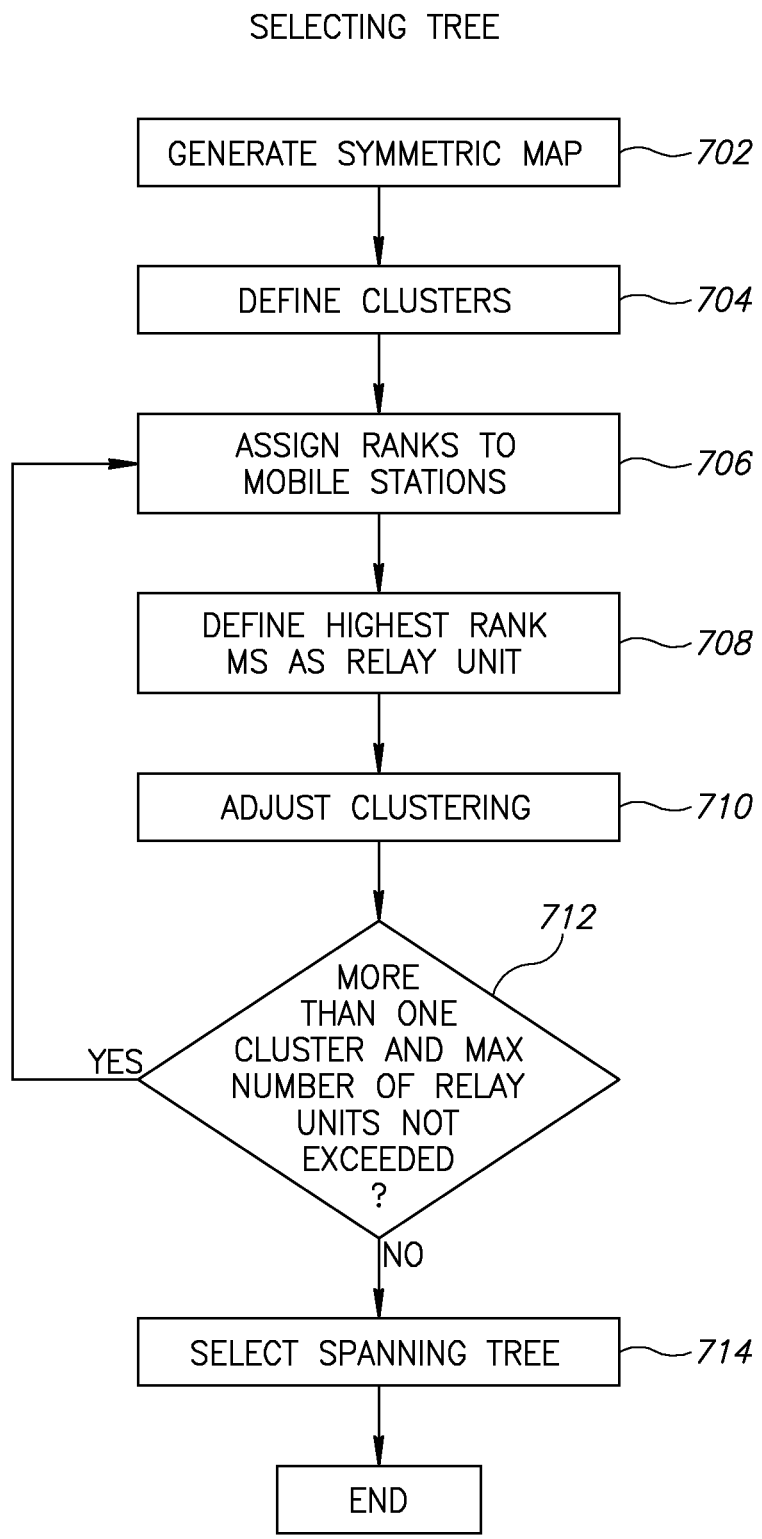
FIG. 6 is a flowchart of acts performed in selecting a backbone tree, in accordance with an exemplary embodiment of the invention.

FIG. 6 is a flowchart of acts performed in selecting relays forming a backbone tree, in accordance with an exemplary embodiment of the invention. For simplicity, a symmetric map (SMAP) is generated (702) from RMAP 402, such that two mobile stations 102 are considered connected only if both mobile stations 102 receive the transmissions of each other.

Each mobile station is optionally defined (704) as belonging to a respective cluster, such that at the beginning of the selection of relay units 152, the number of clusters is equal to the number of mobile stations 102. Each mobile station 102 is optionally assigned (706) a rank, which indicates how effective the mobile station is as a relay unit. The mobile station (MS) 102 with the highest rank is defined (708) as a relay unit and the clustering of the mobile stations 102 is adjusted (710) following the defining of the new relay unit.

If (712) there is still more than one cluster and the number of relays is less than an allowed maximum, the assigning (706) of ranks to each of the mobile stations 102, the defining (708) of another relay unit and the combining (710) of the clusters, are repeated.

When the selection of the relay units is completed, a spanning tree formed of links connecting the relay units 152, is selected (714).

Assigning Rank

Referring in more detail to assigning (706) a rank to each mobile station 102, in some embodiments of the invention, the rank assigned to each mobile station 102 depends on connectivity information of the mobile stations 102 in network 100. Optionally, the assigned rank depends on the number of mobile stations to which the ranked mobile station is directly connected. Alternatively or additionally, the rank assigned to each mobile station 102 depends on the number of mobile stations 102 not in the same cluster as the ranked mobile station, to which the ranked mobile station is directly connected. Further alternatively or additionally, the rank assigned to each mobile station 102 depends on the number of clusters to which the ranked mobile station is directly connected.

In some embodiments of the invention, the rank assigned to a mobile station 102 depends on the number of previously selected relay units to which the mobile station 102 is directly connected. Alternatively or additionally, the rank assigned to a mobile station 102 depends on the number of previously selected relay units in separate clusters, to which the mobile station is connected. In an exemplary embodiment of the invention, the rank is formed of a three value vector including the number of clusters to which the MS is connected to a relay unit 152 in them, the number of clusters to which the MS is connected to a non-relay MS 102 in them and the total number of mobile stations to which the MS is connected. In comparing different mobile stations, the MS with the highest number of relay units in separate clusters, prevails. If the number is equal for both the compared MSs, the decision is optionally made based on the number of clusters to which each MS is connected to only a non-relay MS and if this number is also equal, the total number of neighboring mobile stations 102 is used. If this number is also equal, the mobile station with the lowest identity number is optionally selected.

Alternatively or additionally to comparing the members of the three value vector separately, a weighted average of the three value vector is used.

In some embodiments of the invention, the assigned rank depends only on connectivity information. Alternatively, the assigned rank depends also on status information of the mobile stations, such as their processing power, battery power level, the tasks other than communication in network 100 that the mobile stations perform and/or the models of the mobile stations 102. In an exemplary embodiment of the invention, mobile stations that may require their processing power for communication with external network and/or for operation as a calculator or a recording system, are given a low rank for belonging to the backbone tree, so that their processing resources and/or their battery power can be used for these other tasks.

Referring in more detail to adjusting (710) the clustering, in some embodiments of the invention, the mobile stations 102 directly connected to the newly selected relay unit are added to the cluster of the newly selected relay unit if they belong to a cluster in which they are the only member. In addition, if a directly connected mobile station 102 is a relay unit, the entire cluster to which the relay unit belongs is combined with the cluster of the newly selected relay unit.

Creating Backbone Tree from Relays

In some embodiments of the invention, selecting (714) a spanning tree connecting the relay units is performed after all the relay units are defined. Optionally, any method known in the art for selecting a spanning tree is used to perform the selection of the tree. In some embodiments of the invention, the selection of the tree is based only on the binary connectivity information of the network. Alternatively, the selection of the tree utilizes battery power and/or reception quality information of the relay units.

Alternatively to selecting the spanning tree after all the relay units are defined, the tree is selected in parallel to the defining of the relay units. Each time the cluster adjusting combines two clusters that both include relay units a link connecting two relay units each in a different one of the clusters is marked as belonging to the tree. Optionally, the link is selected arbitrarily. Alternatively, a link with a highest reception level is selected.

Maximal Number of Relays

In some embodiments of the invention, the maximal number of allowed relay units is defined according to the length of cycle 200 (FIG. 2). The maximal number of allowed relay units is optionally such that any additional relay unit would make the length of relay sub-portion 208 and forwarding slots 232 so long that there would not be enough bandwidth for data transmission. Alternatively or additionally, the maximum number of relay units is selected as a function of the number of mobile stations 102 in network 100. In an exemplary embodiment of the invention, the maximal number of allowed relay units is smaller than 20% of the number of mobile stations 102 in network 100 or even less than 10% of the number of mobile stations 102 in network 100.

In an exemplary embodiment of the invention, the maximal number of relays is selected as a function of the expected transmission radius r and corresponding reception zones of the mobile stations 102 and an expected length a and width b of the region in which the mobile stations roam on their mission. Optionally, the maximum number of relay units is selected as a function of the average area within the mission region covered by the transmission zone of a mobile station (it is noted that mobile stations at the edges of the region cover less area of the region than mobile stations in the center of the region). The maximal number of relay units is optionally selected so that the entire area of the region is coverable by the average areas of the zones of the mobile stations with a redundancy factor.

Optionally, the area of the zone is assumed to be $$s = \frac{r^2(3r^2 - 8ra - 8rb + 6ab\pi)}{6ab}$$

and therefore the maximal number of relays is optionally set to abc/s, where c is a redundancy factor, for example c=2.

Optionally, if (712) the maximum number of relay units is exceeded, no more relay units are selected. Optionally, the cycle continues with regular operation, although the backbone tree may not connect to all the mobile stations 102 in the network, and not all mobile stations 102 in network 100 will receive the transmitted data. Optionally, in these embodiments, the master does not assign bandwidth to mobile stations 102 not connected to the spanning tree (optionally it does not receive requests from such mobile stations at all) and/or to mobile stations that need to transmit to mobile stations 102 not connected to the spanning tree. For example, the data frame 204 in cycles in which the number of relay units exceeds a maximum may carry only connectivity information. Alternatively or additionally, data frame 204 in cycles in which the number of relay units exceeds a maximum carry only unicast data and not broadcast data. Thus, in some embodiments of the invention, the allocation of the bandwidth in network 100 depends on the connectivity of the network and/or on the selected spanning tree.

Alternatively, the operation of mobile stations 102 is stopped until the beginning of the next cycle 200. In some embodiments of the invention, when the maximal number of relay units is exceeded in selecting relay units, in a following cycle 200, a different algorithm, which is better suited for minimizing the number of relays is used in selecting the relays. For example, an algorithm which gives less weight, or no weight at all, to the battery power of the mobile stations 102, is used. The different algorithm is optionally used for a predetermined number of cycles and/or until the number of relay units selected is beneath the maximal allowed by a predetermined margin. Optionally, when the alternative algorithm is used, this is indicated in the relay packets transmitted during relay sub-portion 208 to make sure that all mobile stations 102 use the correct algorithm.

In some embodiments of the invention, in order to minimize the number of cases in which the maximal number of relay units is exceeded, a plurality of algorithms are used in determining the spanning tree, and a spanning tree with the least relay units is selected. Alternatively or additionally, the algorithms are organized in an order of preference, and the spanning tree of the algorithm of highest priority which does not exceed the maximal number of relay units, is used. For example, an algorithm which takes battery power into account and an algorithm which does not take battery power into account may be used. The results of the algorithm which takes battery power into account are optionally used, unless the number of relay units exceeds the maximal allowed and the other algorithm results in a spanning tree which does not exceed the allowed number of relay units.

Alternatively or additionally, when the maximal number of relay units is exceeded, the mobile stations 102 change their transmission parameters, for example by increasing their transmission power. Optionally, each mobile station increases its transmission power for a predetermined amount of time, for example 10-50 cycles. Alternatively, only some of the mobile stations 102 increase their transmission power, for example mobile stations 102 that have a relatively high battery power level. In some embodiments of the invention, the mobile stations 102 determine if they are to increase their battery power, based on the connectivity information of the network, e.g., based on the content of their RMAP 402. Optionally, the mobile stations 102 that have a number of receiving neighbors beneath a predetermined threshold increase their transmission power. Alternatively or additionally, a predetermined number of mobile stations 102 having a smallest number of receiving neighbors, increase their transmission power. Alternatively or additionally, the mobile stations 102 determine if they are to increase their transmission power at least partially using a random factor.

Alternatively or additionally to increasing the transmission power, the transmission voice quality is reduced, (e.g., changing the codec used, reducing the number of error correction bits). Optionally, when this alternative is used, the relay packets transmitted during relay sub-portion 208 indicate the change, to make sure that all mobile stations 102 use the correct transmission parameters.

Rate of Spanning Tree Selection

In some embodiments of the invention, the method of FIG. 6 is performed in every cycle 200, and the results of the spanning tree selection are used in the same cycle 200 in which the selection was performed. Alternatively, in order to add to the stability of the network, the newly selected spanning tree is used only if is substantially different from the old spanning tree which was used in the previous cycle 200. Thus, a spanning tree which was successful in previous cycles is not replaced, unless there are substantial changes in the connectivity of the network. Alternatively or additionally, after a predetermined number of cycles, e.g., 50 cycles or even 100 cycles, the spanning tree is replaced regardless of its suitability and/or the extent of changes in the connectivity of the network. In some embodiments of the invention, a spanning tree is used without recalculation for at most 5 minutes or even at most half a minute. Optionally, a spanning tree is used if no discrepancies are identified, for at least 10 seconds or even for at least 2 minutes. Optionally, the period of forced recalculation of the spanning tree is selected according to the rate at which the relative locations of the mobile stations 102 are expected to change.

In some embodiments of the invention, the rate at which forced recalculation is performed is configured in the mobile stations 102 at the beginning of each mission. For example, the rate of forced spanning tree reselection in a mission in which the holders of mobile stations 102 walk is optionally smaller than when mobile stations 102 are on vehicles.

In some embodiments of the invention, when a discrepancy is identified between the spanning trees as perceived by different mobile stations 102, a newly selected spanning tree is used.

Alternatively to selecting a new spanning tree in each cycle and then determining whether to use the new or old spanning tree, a new spanning tree is selected only after it was determined that the new spanning tree is to be used. Using this alternative, optionally reduces the battery consumption for calculations.

Optionally, in accordance with this alternative, the determination of whether to select a new spanning tree is performed based on the time from previously selecting the old spanning tree which is used and/or based on whether a discrepancy was identified in the network. Alternatively or additionally, the determination of whether to select a new spanning tree depends on the amount of changes in the connectivity of the network. For example, each mobile station optionally counts the number of changes it made in its RMAP 402 since the last time it selected a spanning tree. When the number of changes exceeds a predetermined value, a new spanning tree is selected.

In some embodiments of the invention, after generating (702) the symmetric map (SMAP), the rows and columns of any MSs that are not connected, even indirectly, to the mobile station performing the determination are set to zero, so that their values do not interfere with the determination when their MSs are not connected to a sub-network to which the determining mobile station belongs.

Alternatively to generating (702) the symmetric map (SMAP) and selecting the relay units based on the symmetric map, the selection of the relay units is performed directly based on RMAP 402.

Checking for Discrepancies in Network

In some embodiments of the invention, mobile stations 102 serving as relay units check for discrepancies between the spanning tree they selected and the spanning tree determined by other mobile stations 102. If a discrepancy is identified, the mobile station 102 identifying the discrepancy transmits an indication of the discrepancy in its RQMF packet 222. The indication is then propagated throughout the network by mobile stations 102 receiving the indication, in RQMF and RSMF packets, so that in the next cycle 200 a new spanning tree is selected.

Discrepancies are optionally identified by comparing the transmissions received during relay sub-portion 208 with the current spanning tree of the mobile station. If, for example, a relay unit is supposed to receive an RQMF packet 222 or an RSMF packet 224 before it generates its relay packet, but the packet was not received, a discrepancy is optionally determined. Alternatively or additionally, if a packet is received at a time in which a different relay unit is supposed to transmit according to the current spanning tree of the mobile station, a discrepancy is identified. Further alternatively or additionally, the current spanning tree is transmitted within the RQMF and/or RSMF packets. The relay units receiving these packets compare the spanning tree they determined to the spanning tree in the received packet, and a discrepancy is identified if the spanning trees are not the same. In some embodiments of the invention, the current spanning tree is transmitted in RQMF packets compressed, for example using the same compression method used for transmitting the rows 406 of RMAP 402. In some embodiments of the invention, when a new spanning tree is selected, the spanning tree is transmitted in some or all of the UMF packets, instead of one or more of the rows 406. It is noted that, in some embodiments of the invention, transmission of the spanning tree includes transmission of the links connecting the relay units in addition to transmitting the list of the relay units. Optionally, the list of relay units is encoded and/or compressed in the same way rows are encoded and the links are encoded by a binary square matrix of the size of the number of relay units, which has a positive value at intersections of relay units that are connected by a link of the tree. The binary matrix is optionally encoded in a manner similar to that described above for encoding rows of RMAP 402. Alternatively to transmitting the spanning tree only when a new tree is selected, the UMF packets include the current spanning tree in substantially every cycle 200.

If an inconsistency indication is transmitted by a mobile station in an RQMF packet, the indication will be propagated to the master, which will return it to all the stations in the RSMF packets, such that by the beginning of the next cycle 200, all of the mobile stations 102 should be aware of the indication (either by receiving an RSMF packet with the indication or by not receiving an RSMF packet when expected) and select a new spanning tree. In some embodiments of the invention, a mobile station first identifying a discrepancy after it transmitted its RQMF packet but before transmitting its RSMF packet, waits until transmission of the RQMF packet in the next cycle 200 to indicate the discrepancy, in order to make sure that the indication will reach all the mobile stations before the mobile stations select a spanning tree and there will not be a group of mobile stations that are not aware of the discrepancy indication.

Alternatively, discrepancy indications are transmitted for the first time even in RSMF packets, for example under the assumption that other relay units will identify the discrepancy, such that it will reach substantially all the mobile stations. In some embodiments of the invention, the discrepancy indication is transmitted also in UMF packets, to increase the chances that the mobile stations throughout the network receive the indications. Furthermore, the discrepancy indication is optionally transmitted by the relay units when they relay data in slots 232 during data frame 204.

In some embodiments of the invention, when a mobile station 102 which is not a relay unit identifies a discrepancy, the mobile station transmits a discrepancy indication in its UMF packet. Alternatively or additionally, a mobile station identifying a discrepancy and having bandwidth for data transmission, transmits the indication along with transmitted data. Further alternatively or additionally, one or more short periods not assigned to a specific mobile station 102 are defined in each cycle 200, for transmission of a discrepancy notification by a non-relay mobile station. Optionally, the short time slot is defined between RQMF 222 and RSMF 224. In some embodiments of the invention, however, only relays are allowed to notify on discrepancies, in order to avoid a problem in a single mobile station from shaking the entire network. The relays will generally identify all important problems in the network.

In addition to forcing the selection of a new spanning tree, the discrepancy indication may force other actions on one or more of the mobile stations of the network, for example, actions suggested above to be performed when the number of relay units exceeds the allowed maximum. Optionally, when a discrepancy is identified, the master adjusts the allocation of bandwidth accordingly, for example by allocating bandwidth only to unicast transmission and/or only to urgent transmissions. In some embodiments of the invention, when a discrepancy is identified, the master allocates bandwidth to mobile stations that will benefit from the transmission of data only to some mobile stations of the network.

In some embodiments of the invention, when the discrepancy indication is transmitted for a plurality of cycles 200, for example at least three or even at least eight consecutive cycles, at least some of the mobile stations increase their transmission power and/or one or more other transmission parameters are changed. For example, a stronger FEC may be used for the transmitted data. In accordance with this example, the master optionally allocates larger portions of bandwidth to accommodate for the increased amount of bits required for the FEC.

It is noted, however, that in some cases nothing that any of the mobile stations does, including the master, or a few mobile stations which believe they are the master, will solve the problem of discrepancies and only time and/or improvement in the transmission conditions will remedy the problem.

In some embodiments of the invention, when a mobile station 102 receives transmissions from another mobile station that is disconnected from the relay stations, the mobile station 102 identifying the disconnected mobile station indicates a discrepancy in the network. Alternatively, the identifying mobile station 102 notifies in its UMF that it identified a disconnected MS and the notification is forwarded to the master in the RQMF packets. Optionally, if the current spanning tree has less than the maximal allowed number of spanning trees, the master transmits in the RSMF packets an instruction to add the notifying mobile station 102 as a relay to the tree. If, however, the tree has a maximal number of relays already and the number of mobile stations 102 not connected to the tree exceeds a predetermined value, the master notifies that a discrepancy was determined. The number of allowed disconnected MSs 102 may be zero, or may be higher, for example up to 2% or up to 5% of the MSs 102 in the network.

Merging Disjoint Clusters

In times, the mobile stations 102 of a single mission, may form two or more separate clusters which or distanced from each other in a manner which prevents their mobile stations 102 from communicating with each other. These clusters each generate a separate spanning tree and synchronize their clocks with each other separately. It may occur that two such clusters approach each other and members of two of the clusters are able to directly communicate with each other. When this occurs, there is a risk that the transmissions of the two clusters will interfere with each other due to disagreement on the correct clock. In addition, even if the clocks of the units are synchronized, time may be wasted until all the mobile stations agree on a single spanning tree. In some embodiments of the invention, mobile stations 102 periodically advertise their clock value and the mobile stations receiving an advertisement verify that the clock values are synchronized and if not some of the mobile stations adjust their clock values to others according to predetermined rules, discussed hereinbelow. This causes meeting mobile stations to quickly assume a common clock value, although it may take some time until the network stabilizes. This procedure may be used in addition to, or instead of, the synchronization to the clock of the master in RSMF state 224.

In some embodiments of the invention, when a mobile station 102 receives an advertised clock value smaller (or higher) than its clock value it adjusts its clock value to the received clock value. Alternatively, any other predetermined rule may be used in determining which mobile station 102 adjusts its clock value to the other mobile station (e.g., according to the IDs of the mobile stations). Possibly, the clock of a larger cluster is utilized by mobile stations of a smaller cluster as is now described, to avoid cases in which 99 mobile stations adjust to a clock of a single mobile station. Such adjustment of the majority to the minority will generally result in much more disruption of the network.

Possibly, immediately upon determining by a mobile station that it should adjust to the clock of another mobile station of a different cluster, the mobile station adjusts its clock value to that of the new cluster and participates in the transmissions of that cluster. Alternatively, in order to speed up the process of merging clusters, upon a meeting of two mobile stations from different previously disjoint clusters, the merging of the clusters is performed in two stages. In a first stage, the meeting mobile stations exchange their topological information and each mobile station advertises the information on the other cluster throughout its cluster. Possibly, the information is advertised in a data packet which carries connectivity information. Only after the connectivity information is disseminated, the mobile stations of the small cluster drop the small cluster and join the large cluster by shifting their clock and relating solely to its connectivity information.

Determining the Larger Cluster

Possibly, each UMF 206 transmitted includes a field identifying the number of mobile stations in a cluster to which the transmitting mobile station belongs. It is noted that the field identifying the number of the mobile stations in the cluster may be included additionally or alternatively in other transmissions, such as those of the RQMF.

Whenever a mobile station 102 receives a UMF 206 from a mobile station not previously in its cluster, the mobile station determines whether its cluster is larger than the cluster of the other mobile station. The mobile station 102 with the smaller cluster adapts the clock of the other mobile station, joining the larger cluster. In some embodiments of the invention, the mobile station 102 of the smaller cluster calculates the required time shift in order to adjust to the clock of the larger cluster and transmits the calculated shift throughout its old cluster, for example using its UMF 206 and RQMF values. Optionally, each mobile station 102 of the old cluster that receives the required shift, immediately adjusts its clock in order to minimize the time in which a conflict between the clusters is possible. Alternatively, the adjustment of the shift is delayed until all existent voice sessions are completed, in order not to interrupt voice sessions in the middle. Possibly, until the shift is performed, new requests to establish a voice session are rejected, optionally unless they are tagged as urgent.

In some embodiments of the invention, when two clusters include the same number of mobile stations, the determination of which cluster prevails is performed according to any suitable criteria depending on a parameter which is different for different mobile stations, such as the clock value and/or a unit ID. Possibly, the mobile station with the highest or lowest unit ID or clock value, is used.

Possibly, each mobile station calculates its own cluster size from its connectivity matrix RMAP 402. Alternatively, the size of the cluster advertised by each mobile station is passed along the selected spanning tree to the master in RQMF 222, in order to minimize the chances that the decision on which cluster is larger be based on old information. The master selects the value to be used (e.g., the largest value) and returns this value to all the mobile stations in RSMF 224. Possibly, if a value selected by the master is not available to a specific mobile station (e.g., RSMFs were not received recently by the mobile station), it uses its own calculated value.

Listening for Other Clusters

As to identifying signals from other clusters, mobile stations 102 are optionally adapted to listen to packets transmitted out of the required order of their cluster. Possibly, the mobile stations are adapted to identify such out of order transmissions only during the UMF state, in which they are listening for UMF packets anyhow. On the other hand, during the other portions of each cycle, mobile stations possibly listen only if they expect a transmission and thus conserve battery power. Optionally, in order to increase the chances of detection, the order of the transmission of the UMF packets is cyclically varied, so that mobile stations 102 transmit their UMF packets at different times during the cycle and thus increase the chances of quick detection of the packets by other mobile stations. In an exemplary embodiment of the invention, for 100 mobile stations having IDs from 1-100, during a first cycle the order of transmission of the UMFs is 1, 2, 3, . . . , 100, during a second cycle the order is 100, 1, 2, . . . , 99, during a third cycle the order is 99, 100, 1, 2, . . . , 98 and so on. Further alternatively, a random order may be selected by the master once in every predetermined number of cycles (e.g., every 50-100 cycles) and the random order is distributed throughout the network.

In other embodiments of the invention, mobile stations listen for transmissions from mobile stations of other clusters continuously, for example when battery consumption is not considered a problem. Possibly, mobile stations listen for signals of other clusters some of the time in which they do not need to listen for transmissions of their cluster, for example less than 50%, 25% or even less than 15% of the time in which they do not need to receive signals from mobile stations of their cluster. Possibly, the times at which mobile stations listen for mobile stations from other clusters depends on the number of mobile stations belonging to the mission but not belonging to the current cluster and/or depending on the battery power level of the mobile station. In some embodiments of the invention, the periods in which the mobile station listens for transmissions of other clusters are selected randomly. Alternatively, the periods of listening for other cluster transmissions are predetermined.

Possibly, when a cluster includes more than half the mobile stations 102 of the current mission, the mobile stations of the cluster do not listen for mobile stations of other clusters, as if another cluster is encountered that cluster will adjust to the larger cluster and it is its task to identify the larger cluster.

Other Spanning Tree Selection Methods

Alternatively to the method of FIG. 6, any other method may be used for selecting the relays and generating a spanning tree. In an exemplary embodiment of the invention, the method of FIG. 6 is modified to first select one or more mobile stations 102 which must belong to the spanning tree, if there are such mobile stations. For example, a mobile station 102 that is the only MS that receives signals from another mobile station, is optionally defined as a relay unit, before selecting other relay units according to their ranking.

In some embodiments of the invention, a method which relates to one way connections between mobile stations 102 in which a first mobile station 102 receives the transmissions of a second mobile station 102, but the second mobile station does not receive the transmissions of the first, is used.

Selecting a Master

In some embodiments of the invention, the master is selected arbitrarily without relation to the locations or connectivity of the relay units and/or the operational status (e.g., battery power) of the relay units. In an exemplary embodiment of the invention, the master is selected as the relay unit with a lowest (or highest) ID. Alternatively, the master is selected as a most central relay unit in the spanning tree, e.g., the relay unit with the most neighbors.

Alternatively to selecting a master from the relay units, a master not from the relay units may be selected. Such selection may require an additional transmission hop in relay sub-portion 208, but allows for more flexibility in selecting the master. For example, a mobile station 102 with a highest battery level may be selected to be the master. Alternatively or additionally, a mobile station most adapted to serve as a master as is now described, is selected to be the master.

In some embodiments of the invention, only some of the mobile stations 102 are allowed to be the master, possibly for security purposes and/or due to a requirement of dedicated hardware or software not available on all mobile stations 102. Alternatively, the mobile stations 102 are divided into groups according to their level of adaptation to being the master. For example, all mobile stations 102 may have a basic software for bandwidth allocation, while some mobile stations 102 include a dedicated hardware and/or a more sophisticated software for bandwidth allocation. Preference to being the master may also be given to mobile stations 102 that have a link to an external network, through which information on priorities of bandwidth allocation (e.g., a station identity to receive high priority and/or a type of data to receive priority) are received.

Optionally, in accordance with these embodiments, in selection of the relay units, provisions are taken to make sure, when possible, that at least one of the selected relay units can serve as a master or has a highest level of adaptation to serve as a master. In selecting the master, a relay unit with a highest adaptation level for serving as a master, is optionally chosen.

Transmission Order

Referring in more detail to determining a transmission order for relay sub-portion 208, in some embodiments of the invention, the order is determined using a tree traversal method (e.g., depth first search) on the backbone tree, starting from the selected master. The method used is optionally one which does not allow visiting a node of the tree before its parent was visited. In response sub-frame 224, the transmission order is used from the master which transmits the bandwidth allocation to leaves of the spanning tree. In request sub-frame 222, the transmission order is used from the leaves of the tree, to the master which serves as the root, where no node is traversed before its children were traversed.

In some embodiments of the invention, at any time during relay sub-portion 208, only a single relay unit is scheduled to transmit. Alternatively, at the beginning of RQMF 222, when the transmitting relay units are remote from the master, a single slot 240 is assigned to two or more relay units on opposite sides of the network. Similarly, at the end of RSMF 224, a single slot 240 is assigned to a plurality of relay units. Optionally, a single slot 240 is assigned to two or more relay units when the number of hops on the shortest path between the relay units is at least three or even at least five intermediate units, such that the transmissions of the relay units will not interfere with each other.

Transmission of Requests and Allocation

Referring in more detail to transmitting a list of the requests in request sub-frame 222, in some embodiments of the invention, each relay unit which is a leaf in the spanning tree transmits a list of IDs of the mobile stations 102 from which it received UMF packets together with the indications each of the mobile stations transmitted on its bandwidth requests. The list optionally also includes the relay unit transmitting the list. Optionally, relay units that are not leaves generate their own list of mobile stations they service (including themselves) and combine their list to the lists transmitted to them by their child nodes in previous slots 240 of relay management sub-frame 222. The combined list is then transmitted in their slot 240.

In some embodiments of the invention, when the list is too long to fit into the slot 240 that is to carry the list, the relay unit transmitting the list takes out of the list information which is less important. Optionally, when a same mobile station is mentioned in the list of two different relay units, the relay unit combining the lists cancels one of the entries of the mobile station in the list. Alternatively or additionally, the relay unit does not transmit information on mobile stations that did not request bandwidth. Further alternatively or additionally, the relay unit removes from the list low priority bandwidth requests.

Bandwidth Allocation

Referring in more detail to allocating the bandwidth of data frame 204 by the master 156, in some embodiments of the invention, all slots 230 and 232 in data frame 204 have the same size. In accordance with these embodiments, in requesting bandwidth in slots 212, each mobile station optionally simply states in a single bit whether it requires bandwidth. Alternatively, the bandwidth requests may provide information used in determining which mobile station should receive bandwidth allocation, although the amount of bandwidth is not adjustable. The size of slots 230 and 232 is optionally selected according to voice transmission requirements and slots for text have the same size as slots for voice signals.

Alternatively, different mobile stations 102 and/or requests for different types of data are allocated different amounts of bandwidth. In an exemplary embodiment of the invention, some mobile stations are considered high priority stations (e.g., commander stations) and they are allocated bandwidth for high quality voice (e.g., 9600 bps), while other mobile stations 102 are allocated bandwidth suitable for low quality voice (e.g., 4800 bps). In some embodiments of the invention, in requesting bandwidth in slots 212, each mobile station 102 indicates the type of information it plans to transmit, so that the master can determine how much bandwidth to allocate to each mobile station.

In an exemplary embodiment of the invention, each mobile station indicates whether it plans to transmit voice or text. Alternatively or additionally, each mobile station requesting bandwidth indicates whether it plans to perform real time or non-real-time transmission.

Further alternatively or additionally, each mobile station requesting bandwidth indicates an importance (priority) of the transmission. For example, mobile stations 102 may include an emergency button, which is pressed by users only when a user feels that he must transmit immediately. When the button is pressed, the requests for bandwidth of the mobile station are identified as being high priority. Alternatively or additionally, a signal processing (SP) unit 136 in mobile station 102 identifies screaming and/or hysteric behavior and requests high priority bandwidth in the next cycle. The indication of the importance of the transmission includes, in some embodiments of the invention, indication of the number of cycles 200 in which the requests of the mobile station were not allocated bandwidth. Mobile stations waiting a large number of cycles for bandwidth allocation are optionally provided higher priority.

Optionally, each mobile station indicates in its bandwidth request whether it is requesting bandwidth for a new connection or for continuing an ongoing connection. Although this information can be derived by the master from stored information of previous allocations, the transmission of the indication by the requester simplifies the operation of mobile stations 102 and increases the robustness of the network. The inclusion of the indication of an ongoing connection in the request, reduces the amount of calculations the master needs to perform and the network history data the mobile stations need to store for the case they become masters. In some embodiments of the invention, the transmission of data which can be summarized in a small number of bits is used in a plurality of different situations, instead of storing history information. In some embodiments of the invention, when bandwidth is requested for a continuing connection, the requesting mobile station 102 transmits with the request a channel ID previously assigned to the connection.

Alternatively or additionally, the master stores the bandwidth allocation for one or more previous cycles, and accordingly determines whether requests relate to new connections or on-going connections. This alternative reduces the bandwidth required for the bandwidth request, but may in some cases increase the chances of an error due to missing history information.

Optionally, mobile stations 102 may request bandwidth for transmission of connectivity information, when the mobile station does not succeed to transmit its connectivity information in its slot 212. In some embodiments of the invention, the request for bandwidth for connectivity information includes a priority indication which depends on the backlog of the mobile station in transmission of connectivity information. Alternatively or additionally, when the master determines that there is available bandwidth it instructs mobile stations to transmit connectivity information, even mobile stations that did not request bandwidth at all.

In some embodiments of the invention, a mobile station 102 may request bandwidth for a plurality of different reasons. The master optionally relates to the requests as if they came from a plurality of different mobile stations 102. Alternatively, the request with the highest priority is given its normal priority, while the remaining requests are given a very low priority, in order to prevent monopolizing of bandwidth by a single mobile station.

The master optionally allocates the bandwidth of data frame 204 based on the priorities of the messages for which bandwidth is requested. High priority requests may be due to the requesting mobile station being considered of a high priority, due to the mobile station stating a high priority in its request, due to the mobile station being in the middle of an ongoing connection, due to the type of data for which the mobile station requests bandwidth and/or any other reason which affects the priority.

In an exemplary embodiment of the invention, real time messages are given precedence over non-real time requests. Continuation of a connection is optionally given priority over establishing a new connection.

In some embodiments of the invention, in order to simplify the operation of the master, the requests are classified as belonging to several priority levels. The bandwidth is allocated sequentially to the requests according to the levels of priority, until the bandwidth of the cycle is exhausted. Alternatively, more sophisticated algorithms are used in allocating the bandwidth, for example keeping track of previous allocations and attempting to achieve a more fair allocation.

Optionally, when a mobile station 102 is assigned bandwidth in order to continue a real time voice transmission, the mobile station is allocated a slot in substantially the same location within the cycle as it previously received, in order not to have a longer delay than the length of a cycle between consecutive voice transmissions. Alternatively, the mobile stations 102 wait until the end of the cycle before they sound received voice signals, so that it does not matter where in the cycle the voice signals are received.

Selecting a Neighboring Relay

In some embodiments of the invention, each relay unit includes in the list of mobile stations and their requests, a list of the relay units that heard the request (i.e., those relay units that included the mobile station in their list). The master receives the list and selects which relay unit will service each mobile station that is allocated bandwidth. Along with the bandwidth allocation to each mobile station, the master instructs in response sub-frame 224, which relay unit is to service the mobile station which was allocated bandwidth.

Alternatively, each mobile station 102 receiving bandwidth for transmission selects a relay unit which is to service it and identifies this relay unit in the data packet it transmits in its allocated bandwidth. The selection optionally includes selecting an arbitrary relay unit from the relay units directly connected to the selecting mobile station 102. The arbitrary selection optionally does not depend on the current status (e.g., connectivity) of the network, except that the relay unit is connected to the selecting mobile station. Optionally, the arbitrary selection does not depend on the status (e.g., power level) of any of the mobile stations 102 of the network. In an exemplary embodiment of the invention, the directly neighboring relay unit with the lowest (or highest) ID is selected. In some embodiments of the invention, mobile stations 102 that requested bandwidth perform the selection of the relay before they receive an indication that they were allocated bandwidth, in order to avoid transmission delays due to the processing required to determine the relay.

Alternatively to an arbitrary selection of a neighboring relay unit, the relay unit to service mobile station 102 is selected based on the quality of transmission between the mobile station 102 and each of the relay units to which it is connected. Further alternatively or additionally, the selection of the servicing neighboring unit depends on the battery power levels of the relay units.

RSMF

After determining the allocation, the master transmits the allocation in a packet transmitted in a slot of RSMF 224. The bandwidth allocation packet optionally includes for each allocated slot, identification of the allocated slot, identification of the mobile station allocated the slot and the identity of the relay unit to service the mobile station for the present allocated slot. The RSMF packet optionally also includes a clock value of the master and all the mobile stations 102 of the network adjust their clocks to the value of the master. The clock adjustment may be performed in every cycle or every several cycles, for example every 10-20 cycles.

The identification of the slot optionally includes the start point of the slot relative to the beginning of the cycle or any other anchor point in the cycle. In some embodiments of the invention, the identification of the slot also includes the size of the slot and/or the end-point of the slot. Alternatively, the end of the slot is determined from the start point of a next allocated slot and/or from the end of the cycle. In some embodiments of the invention, data frame 204 is divided into a predetermined number of slots with equal sizes. The allocation optionally simply indicates a predetermined number assigned to the slot.

Connectivity Data Transmitted During the Data Frame

In some embodiments of the invention, when there is extra bandwidth in frame 204 after all the requesting mobile stations were allocated bandwidth, the extra bandwidth is not allocated. Alternatively, the extra bandwidth is allocated to one or more mobile stations 102 for transmission of their connectivity perception of the network. The mobile station 102 to which the bandwidth is assigned transmits a plurality of rows of its RMAP 402 in its assigned slot 230. The relay units of the spanning tree retransmit the transmitted connectivity data from slot 230 in their data forwarding slots 232, such that the transmitted connectivity data propagates to all the mobile stations 102 of the network in a single cycle 200. The receiving mobile stations 102 (including the relay units) update their RMAPs 402 based on the received connectivity data.

Alternatively or additionally to simply retransmitting the connectivity data from slot 230, each relay unit receiving the connectivity data compares the received rows 406 to the connectivity data in its RMAP 402. If the relay unit has more up to date information, the relay unit replaces the row data it received, with its more up to date row.

In some embodiments of the invention, the mobile stations 102 assigned bandwidth for transmission of connectivity data during data frame 204, are selected as the mobile stations 102 having a most recent oldest row time stamp, as this mobile station is expected to have most up to date connectivity data. Optionally, to this effect, in slot 212, each mobile station reports the time stamp of its oldest row time stamp. Alternatively, for simplicity, a mobile station 102 which receives transmissions from a largest number of other mobile stations, as indicated by its respective row 406 in RMAP 402 of the master, is selected to provide the connectivity information in data frame 204. Further alternatively, the mobile station 102 to provide connectivity information is selected arbitrarily, e.g., randomly. Further alternatively or additionally, each mobile station manages a list of mobile stations 102 that had a chance to transmit their connectivity information during data frame 204, and a current mobile station to transmit connectivity data in data frame 204 is selected accordingly. Optionally, a mobile station that did not recently have a chance to transmit connectivity data in data frame 204 is assigned the bandwidth. Further alternatively or additionally, in slots 212, each mobile station 102 reports the number of rows that it has not transmitted yet, i.e., are different between RMAP 402 and TMAP 404. The mobile station(s) reporting a largest amount of rows not transmitted yet are assigned additional bandwidth.

As mentioned above, in some embodiments of the invention, mobile stations 102 may request bandwidth for transmission of connectivity information, when they have a backlog in transmission of their connectivity information.

Optionally, in accordance with these embodiments, the mobile station 102 with the largest backlog is allocated the bandwidth.

Data Transmission

In some embodiments of the invention, during data frame 204, after each data packet is transmitted by its source mobile station 102, all the relay units retransmit the data packet. The retransmission is begun by the relay unit assigned to service the source mobile station and is optionally followed in an order of a tree traversing algorithm, such as DFS.

Alternatively, the data packets are first transmitted by all the source mobile stations serviced by a single relay unit and then the data packets are relayed together by the relay units. Optionally, in determining the bandwidth allocation, the master gives preference to assigning bandwidth together in a single cycle, to mobile stations 102 that can be serviced by the same relay unit.

The retransmissions of the data packets by the relay units are optionally each transmitted in separate relays slots 232, such that two relay units 152 do not transmit simultaneously. Alternatively, in allocating bandwidth, the master allocates whenever possible, a single relay slot 232 to two different relay units 152 that are separated from each other sufficiently, so that they do not interfere with each other in any of the receiving mobile stations 102. In an exemplary embodiment of the invention, a predetermined number of slots 232 are allocated for data of a first mobile station 102. A plurality (e.g., 4 or 5) of leading allocated slots are assigned exclusively to the data of the first mobile station, while the following slots are allocated in parallel to data of a second mobile station. The parallel transmission will not interfere any of the mobile stations, due to the separation between the relay units separated by 3-4 relay units down the spanning tree.

Optionally, before allowing simultaneous transmissions, the master checks the connectivity information to make sure that the transmissions will not collide. Optionally, whenever there is a possibility of interference, simultaneous transmission is not used, and/or the number of leading allocated slots is enlarged.

In some embodiments of the invention, all data transmitted within network 100 is treated as broadcast data and is forwarded throughout the network by the relay units. Alternatively, in requesting bandwidth, mobile stations 102 indicate the destination or destinations of the data. When the master allocates bandwidth for the data, it allocates a number of relay slots 232 required for passing the data from the source to the destination. Optionally, the packet carrying the data is transmitted by the source with a list of the relay units through which it is to pass. Alternatively, the relay units receiving the data packet determine whether they are to forward the packet based on the destination of the packet and their RMAP 402. Using unicast transmissions reduces the bandwidth usage for data transmitted between neighboring mobile stations and also reduces the battery utilization of the relay units that do not need to forward data that is not needed by some areas of the network.

Multiple Channels

Alternatively to using a single channel for all the transmissions, two or more frequency or code channels may be used for the transmissions, in order to increase the amount of available bandwidth. In an exemplary embodiment of the invention, one channel is used for management packets and the other channel is used for data packets. Alternatively, the bandwidth of all the channels during the time of a single cycle are considered as belonging to a single concatenated cycle. Optionally, in accordance with this alternative, each of the channels includes both management portions and data portions, organized such that each mobile station 102 receives the connectivity information it needs before it needs to transmit data.

Energy Increase

In some embodiments of the invention, the transmission power of mobile stations 102 is predetermined throughout a specific mission. Optionally, the transmission power is preconfigured for the mission according to the expected time of the mission, the time of life of the batteries of mobile stations 102 and the expected dispersion of the mobile stations 102 during the mission. The mobile stations 102 may all be configured to use the same transmission power or different mobile stations 102 may be configured to use different power levels, for example according to the type of battery they have.

Alternatively, the transmission power levels are adjusted dynamically according to the connectivity conditions. Optionally, each mobile station 102 decides its own transmission power level, according to its RMAP 402 (FIG. 3). In some embodiments of the invention, when a mobile station (MS) 102 determines that it does not receive the transmissions of a neighboring MS 102 from which it received transmissions in a previous cycle, the determining MS 102 changes the value of the location 408 corresponding to the neighboring MS 102 in the row of the determining MS to a '0' bit. In addition, the MS 102 determines from RMAP 402, whether there is any other MS that receives signals from the neighboring MS. If there is no other MS that is directly connected to the neighboring MS, or if the number of MSs 102 connected to the neighboring MS is below a minimum, the determining MS increases its transmission power.

In some embodiments of the invention, a mobile station 102 that identifies that it is receiving UMFs from a newly identified neighbor increases its transmission power to make sure that the newly identified neighbor receives its transmissions. Optionally, after several cycles 200 (e.g., 2-4 cycles), the mobile station determines whether the neighbor is connected to any other mobile station, in which case the transmission power is reduced back to its normal level.

Optionally, UMFs indicate the transmission power at which they are transmitted. The reception power level is optionally also determined. The power margin of the newly identified neighbor is optionally compared to the transmission power of the receiving mobile station and the transmission power is optionally increased to about the determined margin, if necessary.

Optionally, power increases are performed in low steps (e.g., less than 20% of the current transmission), in order to avoid large power utilization. Alternatively, high power increases are used (e.g., above 50%), in order to quickly achieve connection with the disconnected mobile station.

In some embodiments of the invention, the power level is reduced a predetermined time after raising the power level. Alternatively, the mobile station follows the connectivity of the mobile station causing the raise in the transmission power. When it is determined that the mobile station is connected to other mobile stations, the power level is optionally reduced to its normal level. Further alternatively or additionally, the power level is reduced in small steps until connectivity of one or more relay units is lost, at which time the power level is returned to the lowest level at which the connectivity remains. In some embodiments of the invention, the transmission power level is reduced when the reception power from all neighboring units that are not connected to other mobile stations is above a predetermined threshold level. Alternatively or additionally, the UMFs indicate the reception power levels of the mobile stations and the transmission power level is reduced when the neighboring mobile stations 102 that are not connected to other mobile stations indicate reception levels above a predetermined threshold.

In some embodiments of the invention, the transmission power level is reduced when the mobile station 102 determines that the network has superfluous connectivity at the price of relatively high transmission power levels. Superfluous connectivity is optionally identified when it is determined that the number of relay units in the spanning tree is very low, and/or when in a specific area of the network one or more mobile stations have a very large number of neighboring units.

Reception Level

In some embodiments of the invention, in addition to, or instead of, keeping track of binary connectivity information, the mobile stations 102 keep track of the reception quality of transmissions between the mobile stations. These embodiments may be used, for example, with mobile stations that have large memory units and/or may be used with a minimal level indication scheme, for example using between 2-4 bits.

The selection of relay units in accordance with these embodiments optionally takes into account the reception levels, giving preference to forming the spanning tree from high quality reception links.

Alternatively or additionally, the reception quality indications are used in adjusting the transmission power, as mentioned above.

Other Alternatives

In some embodiments of the invention, instead of transmitting the bandwidth requests together with the connectivity information, separate packets for the bandwidth requests and for the connectivity information may be used.

Alternatively including a slot 212 for each mobile station 102 in each cycle 200, a slot 212 is assigned to each mobile station at a lower rate, for example twice every three cycles or even once every two cycles. Optionally, along with data packets, mobile stations 102 indicate whether they need additional data. Thus, UMF packets are required only for requesting bandwidth for a new connection, which can suffer a delay of half a second or even a second. Alternatively or additionally, one or more predetermined contention based slots are defined for requesting bandwidth by mobile stations that were not assigned bandwidth in the current cycle 200.

It will be appreciated that the above-described methods may be varied in many ways, including, changing the order of steps, and/or performing a plurality of steps concurrently. It should also be appreciated that the above described description of methods and apparatus are to be interpreted as including apparatus for carrying out the methods, and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A communication network adapted to allocate bandwidth to stations in said network; said network comprises: (i) a first plurality of one or more stations adapted to operate as routers, and a (ii) a second plurality of one or more end stations, said first and second pluralities of stations being intercommunicated via a mutual network; each station of both said first and second pluralities of stations being adapted to transmit (i) first original information on the subject of the connectivity of said network; (ii) first integrated information on the subject of the connectivity of said network; (iii) second original information on the subject of the bandwidth requirement of the transmitting station; and each station of said first plurality of stations further adapted to transmit (iv) second integrated information on the subject of bandwidth requirements of at least one of said stations being intercommunicated;

said network is adapted to undergo at least one transmission cycle, cooperatively transmitted by said first and second pluralities of stations; said transmission cycle having a) a data frame, having:
i. at least one original data packet; and,
ii. zero or more forwarded data packets; and,
b) a management frame, having:
i. a unit management frame (UMF), having:
(a) a first UMF packet encoding either said first original information, or said first integrated information, or both, as transmitted by one of said first plurality of stations;
(b) a second UMF packet encoding either said first original information, or said first integrated information, or both, as transmitted by one of said second plurality of stations; and,
ii. a relay sub-portion, having:
(a) a request management frame (RQMF); said RQMF comprising at least one RQMF packet encoding said second integrated information;
(b) a response management frame (RSMF,); said RSMF comprising at least one RSMF packet transmitted by one of said first plurality of stations encoding bandwidth allocation information;

and said network comprising a master station being either one of said first plurality of stations or at least one third station, wherein said master station is adapted to generate said bandwidth allocation information to said first and second plurality of stations of predetermined bandwidth in association with size of said UMF packet and said RQMF packet and said RSMF packet, wherein said master station is determined according to said first plurality of one or more stations adapted to operate as routers.

2. The network according to claim 1, wherein said master station sets the station transmitting at least one of said data packets.

3. A continuously self reconfiguring peer-to-peer communication network comprising a first plurality of one or more stations adapted to operate as routers, and at a second plurality of one or more end stations ;said first and second pluralities of stations are adapted to transmit a) first original information on the subject of the connectivity of said network; b) second original information on the subject of bandwidth requirements; and c) first integrated information on the subject of the connectivity of said network; wherein said network sets a master station from either one of said first plurality of stations or at least one second plurality of stations; said master station comprises means for generating bandwidth allocation information to said first and second plurality of stations, in association with said first integrated information received from plurality of stations; and, further wherein said first plurality of stations additionally comprising means for transmitting a) second integrated information on the subject of bandwidth requirements of more than one of said stations being intercommunicated, and b) said bandwidth allocation information.

4. The continuously self reconfiguring peer-to-peer communication network according to claim 3, wherein at least one of said second plurality of stations is adapted to transmit data packets according to said bandwidth allocation information.

5. The continuously self reconfiguring peer-to-peer communication network according to claim 3, wherein at least one of said first plurality of stations act as a relay station by (i) receiving said data packets; and (ii) transmitting the same, according to said bandwidth allocation information.

6. The continuously self reconfiguring peer-to-peer communication network according to claim 3, wherein at least one of said second plurality of stations is selected to operate as one of said first plurality of stations in response to said first original information.

7. The continuously self reconfiguring peer-to-peer communication network according to claim 3, wherein at least one of said first plurality of stations and second plurality of stations is selected to operate as said master station; said selection is according to information selected from a group comprising of said first integrated information, second integrated information and a combination thereof.

8. A method of peer-to-peer communicating a first plurality of one or more stations adapted to operate as routers, with a second plurality of one or more end stations via a mutual network ; said first and second pluralities of stations adapted to process (i) first original information pertaining to the connectivity of said mutual network, (ii) second original information pertaining to their bandwidth requirements, and (iii) first integrated information pertaining to the connectivity of said mutual network, and said first plurality of station further adapted to process (iv) second integrated information pertaining to bandwidth requirements of at least two of said intercommunicated stations; said mutual network comprising at least one master station; said method including a step of transmitting a plurality of communication cycles; said step of transmitting a plurality of cycles comprising at least one step of transmitting one communication cycle, wherein said step of transmitting one cycle comprising steps of:
  a) transmitting said first original information by both said pluralities of stations;
  b) transmitting said second original information by both said pluralities of stations;
  c) transmitting said first integrated information by both said pluralities of stations;
  d) transmitting said second integrated information by said first plurality of stations;
  e) selecting either one of said first plurality of stations, or said second plurality of stations, to operate as a said master station;
  f) generating a bandwidth allocation information, in association with said first integrated information received from plurality of stations by said master station;
  g) relaying said bandwidth allocation information on more than one of said stations by said first plurality of stations; and
  h) transmitting data packets by at least two of said intercommunicated stations.

9. The method according to claim 8, wherein any of the following conditions is true:
  (a) said step of generating bandwidth allocation information is performed responsive to any combination of:
    i. first original information;
    ii. second original information;
    iii. first integrated information; and,
    iv. second integrated information;
  (b) said step of selecting is performed responsive to any combination of:
    i. first original information;
    ii. second original information; and,
    iii. first integrated information;
  (c) at least one of said stations being intercommunicated transmits any of:
    i. said first original information;
    ii. said second original information; and,
    iii. said first integrated information;
    at a time when no other station being intercommunicated transmits any information;
  (d) each station in said first plurality of stations transmit said second integrated information at a time when no other of said stations being interconnected transmits any information; and,
  (e) any of said steps of transmitting or relaying is conducted on one specific channel of communications.

10. The method according to claim 8, further comprising steps of:
  (i) keeping track of known information transmitted by one of the stations being intercommunicated at one of the plurality of cycles;
  (j) eliminating the known information from being transmitted by either the same or another station, or both, at the one of said plurality of cycles, at a another and later cycle of said plurality of cycles, or at both cycles.

11. The method according to claim 8, further comprising steps of:
  i. defining a first part of the information on the subject of connectivity of the network;
  ii. dividing the first part into a second part and a third part; and,
  iii. transmitting said second part in the step of transmitting said first original information during said communication cycle, while either discarding said third part or transmitting it during another of said plurality of communication cycles.

12. The method according to claim 8, wherein step of transmitting integrated information comprises the step of detecting the power by which the original information is transmitted.

13. The method according to claim 8, comprising step of identifying a distant station and a proximal station, both stations being distinct from said master station, so that the distance between said distant station to said master station is greater than the distance between said proximal station and said master station; wherein said step of transmitting either first or second integrated information, or both, comprises a step of transmitting integrated information by said distant station followed by a step of transmitting further integrated information by said proximal station.

14. The method according to claim 8, further comprising step of determining calculated network connectivity responsive to the first integrated information;
> wherein the step of generating bandwidth allocation information is performed responsive to the calculated network connectivity.

15. The method according to claim 14, further comprising step of determining (i) which of at least two stations acts as one first plurality of stations, and (ii) which of the at least two stations acts as one second plurality of stations, responsive to the calculated network connectivity.

16. A mobile station comprising (i) a transceiver adapted to exchange control signals and data packets with similar stations; (ii) a visual interface adapted to present data packets received by said transceiver; and (iii) a means adapted for receiving voice signal; said voice signal is transmitted by said transceiver; said at least one of said similar stations is a master stations comprises means for allocating bandwidth; said control signals comprising any of the following: a) first original information, said first original information pertains to the bandwidth requirement of said mobile station; b) second original information, said second original information pertains to the connectivity of said mobile station with said similar stations; and, c) first integrated information, said first integrated information pertains to the connectivity of said mobile station and the connectivity of said similar stations;
> wherein at least one of said similar stations is adapted to include, in said control signals, a second integrated information, said information pertains to bandwidth requirements of both said mobile and said similar stations; and, further wherein at least one of said similar stations operates means for allocating bandwidth to said plurality of stations, in association with said first integrated information received from said plurality of stations.

17. The mobile station according to claim 16, wherein at least one of said similar stations performs at least one of: (a) inclusion of said second integrated information in said control signals; and (b) operation of said means for allocating bandwidth, by either one of (i) said first original information; (ii) said second original information ;and (iii) said first integrated information, or a combination thereof.

* * * * *